(12) United States Patent
Yamagami

(10) Patent No.: US 8,145,603 B2
(45) Date of Patent: Mar. 27, 2012

(54) METHOD AND APPARATUS FOR DATA RECOVERY USING STORAGE BASED JOURNALING

(75) Inventor: Kenji Yamagami, Los Gatos, CA (US)

(73) Assignee: Hitachi, Ltd., Tokyo (JP)

( * ) Notice: Subject to any disclaimer, the term of this patent is extended or adjusted under 35 U.S.C. 154(b) by 930 days.

(21) Appl. No.: 11/365,096

(22) Filed: Feb. 28, 2006

(65) Prior Publication Data

US 2006/0149798 A1  Jul. 6, 2006

Related U.S. Application Data

(63) Continuation of application No. 10/621,791, filed on Jul. 16, 2003, now abandoned.

(51) Int. Cl.
G06F 17/30 (2006.01)
(52) U.S. Cl. .......................... 707/648; 707/649; 707/678
(58) Field of Classification Search .................. 711/162; 705/36 R; 707/202
See application file for complete search history.

(56) References Cited

U.S. PATENT DOCUMENTS

| | | | |
|---|---|---|---|
| 4,077,059 A | 2/1978 | Cordi et al. |
| 4,823,261 A | 4/1989 | Bank et al. |
| 5,065,311 A | 11/1991 | Masai et al. |
| 5,086,502 A | 2/1992 | Malcolm |
| 5,263,154 A | 11/1993 | Eastridge et al. |
| 5,369,757 A | 11/1994 | Spiro et al. |
| 5,404,508 A | 4/1995 | Konrad et al. |
| 5,479,654 A | 12/1995 | Squibb |
| 5,551,003 A | 8/1996 | Mattson et al. |
| 5,555,371 A | 9/1996 | Duyanovich et al. |
| 5,644,696 A | 7/1997 | Pearson et al. |
| 5,664,186 A | 9/1997 | Bennett et al. |
| 5,680,640 A | 10/1997 | Ofek et al. |
| 5,701,480 A | 12/1997 | Raz |
| 5,720,029 A | 2/1998 | Kern et al. |
| 5,751,997 A | 5/1998 | Kullick et al. |
| 5,835,953 A | 11/1998 | Ohran |
| 5,867,668 A | 2/1999 | Spirakis et al. |
| 5,870,758 A | 2/1999 | Bamford et al. |
| 5,987,575 A | 11/1999 | Yamaguchi |
| 6,081,875 A | 6/2000 | Clifton et al. |
| 6,128,630 A | 10/2000 | Shackelford |
| 6,154,852 A | 11/2000 | Amundson et al. |
| 6,189,016 B1 | 2/2001 | Cabrera et al. |
| 6,269,381 B1 | 7/2001 | St. Pierre et al. |

(Continued)

FOREIGN PATENT DOCUMENTS

JP  03-103941 A  4/1991

(Continued)

OTHER PUBLICATIONS

U.S. Appl. No. 09/588,242, filed Jun. 6, 2000, Poston.

(Continued)

*Primary Examiner* — Mohammad Ali
*Assistant Examiner* — Syed H Hasan
(74) *Attorney, Agent, or Firm* — Mattingly & Malur, P.C.

(57) ABSTRACT

A storage system maintains a journal and a snapshot of one or more data volumes. Two journal entry types are maintained, an AFTER journal entry and a BEFORE journal entry. Two modes of data recovery are provided: "fast" recovery and "undo-able" recovery. A combination of both recovery modes allows the user to quickly recover a targeted data state.

19 Claims, 11 Drawing Sheets

Overflowing JNL

U.S. PATENT DOCUMENTS

| | | |
|---|---|---|
| 6,269,431 B1 | 7/2001 | Dunham |
| 6,298,345 B1 | 10/2001 | Armstrong et al. |
| 6,301,677 B1 | 10/2001 | Squibb |
| 6,324,654 B1 | 11/2001 | Wahl et al. |
| 6,353,878 B1 | 3/2002 | Dunham |
| 6,397,351 B1 | 5/2002 | Miller et al. |
| 6,442,706 B1 | 8/2002 | Wahl et al. |
| 6,473,775 B1 | 10/2002 | Kusters et al. |
| 6,539,462 B1 | 3/2003 | Mikkelsen et al. |
| 6,560,614 B1 | 5/2003 | Barboy et al. |
| 6,587,970 B1 | 7/2003 | Wang et al. |
| 6,594,781 B1 | 7/2003 | Komasaka et al. |
| 6,658,434 B1 | 12/2003 | Watanabe et al. |
| 6,665,815 B1 | 12/2003 | Goldstein et al. |
| 6,691,245 B1 | 2/2004 | DeKoning |
| 6,711,409 B1 | 3/2004 | Zavgren et al. |
| 6,711,572 B2 | 3/2004 | Zakharov et al. |
| 6,728,747 B1 | 4/2004 | Jenkins et al. |
| 6,732,125 B1 | 5/2004 | Autrey et al. |
| 6,742,138 B1 | 5/2004 | Gagne et al. |
| 6,816,872 B1 | 11/2004 | Squibb |
| 6,829,819 B1 | 12/2004 | Crue et al. |
| 6,839,819 B2 * | 1/2005 | Martin ............ 711/162 |
| 6,898,688 B2 | 5/2005 | Martin et al. |
| 6,915,315 B2 | 7/2005 | Autrey et al. |
| 6,978,282 B1 | 12/2005 | Dings et al. |
| 6,981,114 B1 * | 12/2005 | Wu et al. ......... 711/162 |
| 2001/0010070 A1 | 7/2001 | Crockett et al. |
| 2001/0049749 A1 | 12/2001 | Katsuragi et al. |
| 2001/0056438 A1 | 12/2001 | Ito |
| 2002/0016827 A1 | 2/2002 | McCabe et al. |
| 2002/0078244 A1 | 6/2002 | Howard |
| 2002/0111891 A1 * | 8/2002 | Hoffman et al. ........ 705/36 |
| 2003/0074523 A1 | 4/2003 | Johnson |
| 2003/0115225 A1 | 6/2003 | Suzuki et al. |
| 2003/0135650 A1 | 7/2003 | Kano et al. |
| 2003/0177306 A1 | 9/2003 | Cochran et al. |
| 2003/0195903 A1 | 10/2003 | Manley et al. |
| 2003/0220935 A1 | 11/2003 | Vivian et al. |
| 2003/0229764 A1 | 12/2003 | Ohno et al. |
| 2004/0010487 A1 | 1/2004 | Prahlad et al. |
| 2004/0030837 A1 | 2/2004 | Geiner et al. |
| 2004/0044828 A1 | 3/2004 | Gibble et al. |
| 2004/0059882 A1 | 3/2004 | Kedem et al. |
| 2004/0068636 A1 | 4/2004 | Jacobson et al. |
| 2004/0088508 A1 | 5/2004 | Ballard et al. |
| 2004/0117572 A1 | 6/2004 | Welsh et al. |
| 2004/0128470 A1 | 7/2004 | Hetzler et al. |
| 2004/0133575 A1 | 7/2004 | Farmer et al. |
| 2004/0139128 A1 | 7/2004 | Becker et al. |
| 2004/0153558 A1 | 8/2004 | Gunduc et al. |
| 2004/0163009 A1 | 8/2004 | Goldstein et al. |
| 2004/0172577 A1 | 9/2004 | Tan et al. |
| 2004/0225689 A1 | 11/2004 | Dettinger et al. |
| 2004/0250033 A1 | 12/2004 | Prahlad et al. |
| 2004/0250182 A1 | 12/2004 | Lyle et al. |
| 2005/0027892 A1 | 2/2005 | McCabe et al. |
| 2005/0039069 A1 | 2/2005 | Prahlad et al. |
| 2005/0108302 A1 | 5/2005 | Rand et al. |
| 2005/0193031 A1 | 9/2005 | Midgley et al. |
| 2005/0256811 A1 | 11/2005 | Pagel et al. |

FOREIGN PATENT DOCUMENTS

| | | |
|---|---|---|
| JP | 05-002517 A | 1/1993 |
| JP | 11-353215 A | 12/1999 |
| JP | 2000-155708 A | 6/2000 |
| WO | WO03/092166 | 11/2003 |

OTHER PUBLICATIONS

"Continuous Data Protection: Business Continuity for the Era of Networked Storage," Aberdeen Group, Inc. Boston MA (Jul. 2003).

"Making ROI a Snap: Leveraging the Power of Snapshot Technology with ComVault TM, QiNetix TM, Quick Recovery," CommVault Systems, Inc. Oceanport, NJ (2002).

"QiNetix Quick Recovery: Snapshot Management and Recovery," CommVault Systems, Inc. Oceanport, NJ (2005).

"QiNetix: Quick Recovery for Microsoft Exchange," CommVault Systems, Inc. Oceanport, NJ (2003).

Bohannon et al. "Distributed Multi-Level Recovery in Main-Memory Databases," Proceedings of the 4th International Conference on Parallel and Distributed Information Systems, pp. 45-55 (1996).

Elnozahy et al "A Survey of Rollback-Recovery Protocols in Message-Passing Systems," ACM Computing Surverys 34:375-408 (Sep. 2002).

Hunnicutt et al, "Mission Data Storage Consolidation (MDSC)." Space Ops 2002 Conference, Paper ID: T2071 (2002).

Lomet et al "Efficient Transparent Application Recovery In Client-Server Information Systems."Proceedings of 1998 ACM SIGMOD International Conference on Management of Data, pp. 460-471 (1998).

Park et al "An Efficient Recovery Scheme for Mobile Computing Environments," Proceeding of the 8th International Conference on Parallel and Distributed Systems (2001).

Thatte "Persistent Memory: A Storage Architecture for Object-Oriented Database Systems," Proceedings of the ACM/IEEE International Workshop on Object-Oriented Database Systems, Pacific Grove, CA, pp. 148-159 (1986).

* cited by examiner

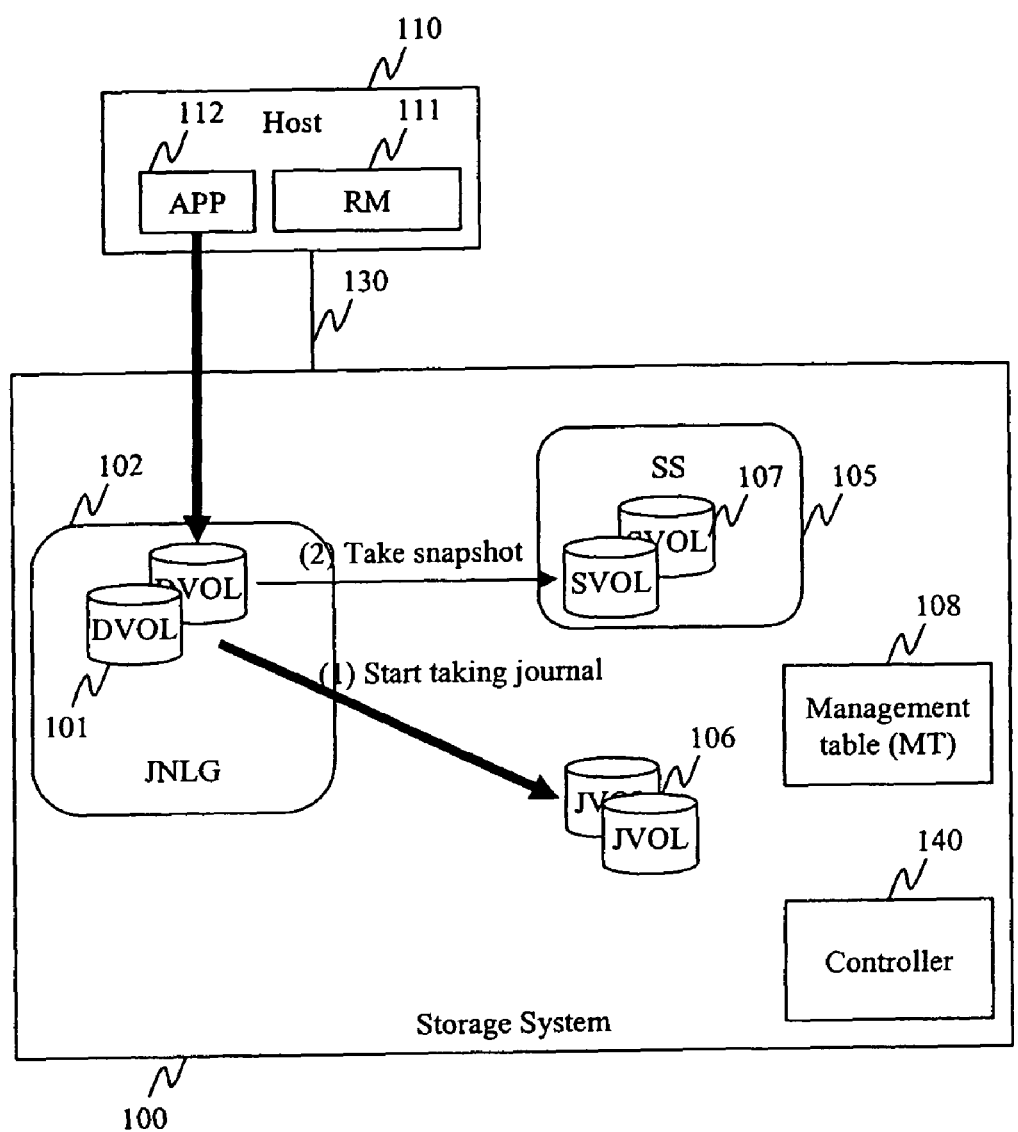
Fig. 1 Overview of backup

Fig. 2 Control Data for Journal
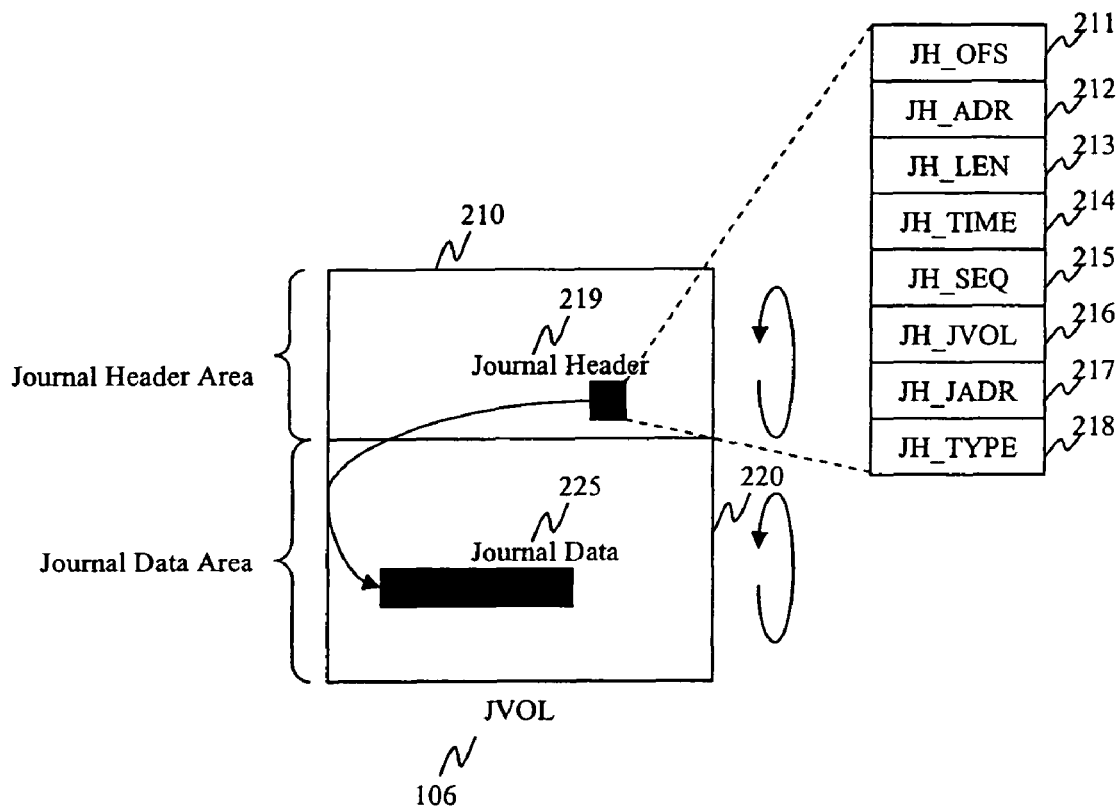

Fig. 3 MT(Management Table) 300
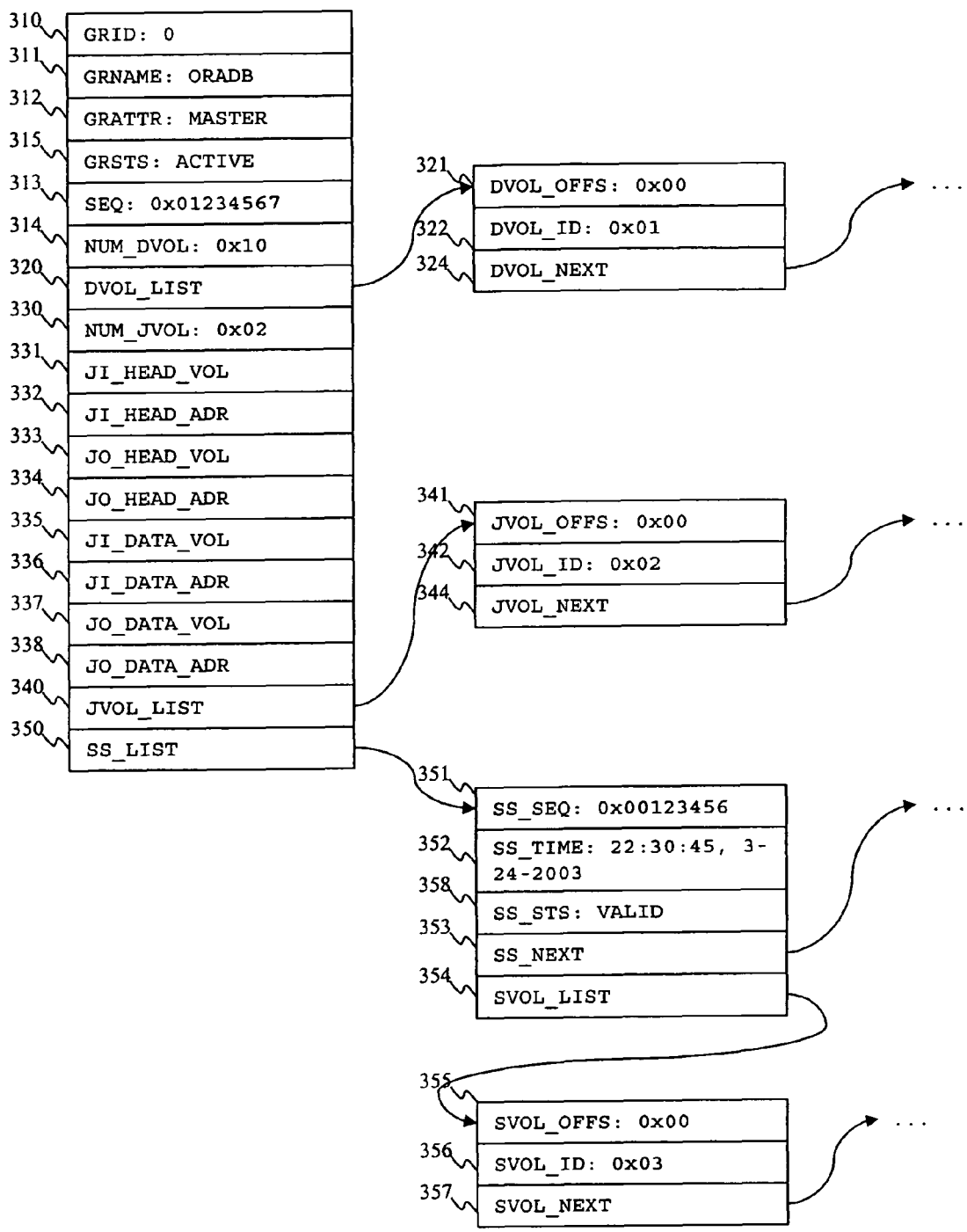

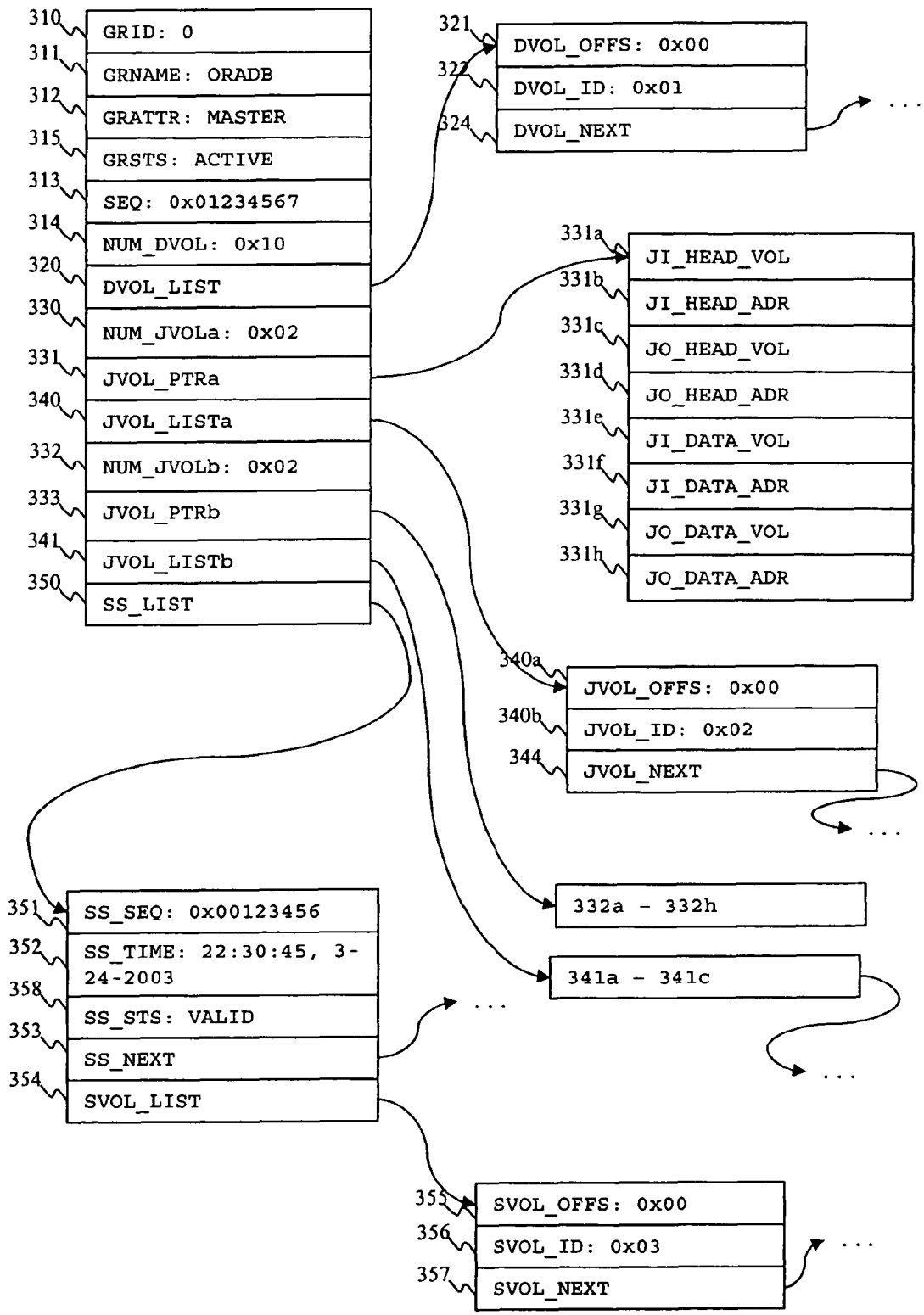
Fig. 3A MT(Management Table) 300'

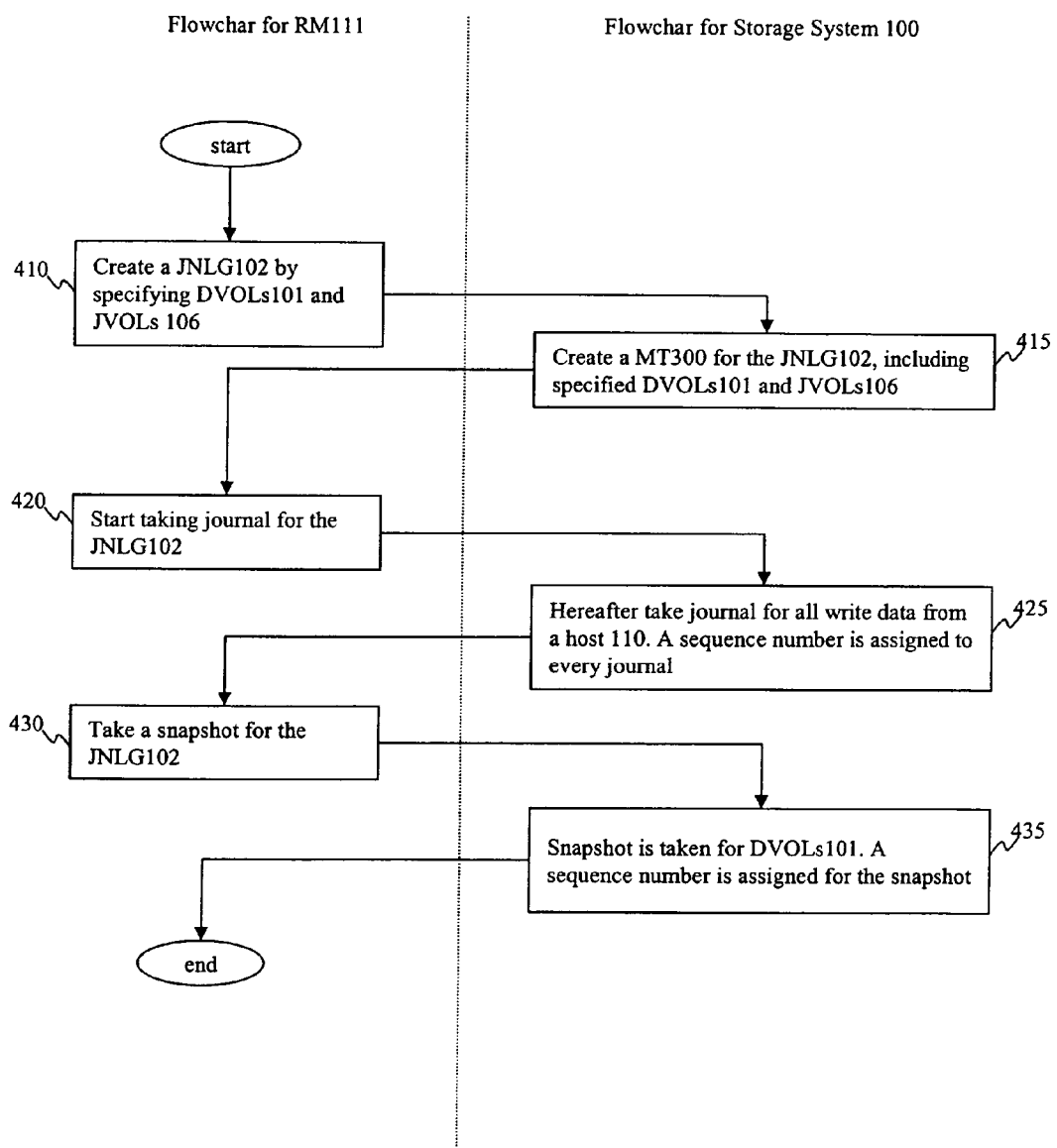
Fig. 4 Starting journal

Fig. 5 Relationship between snapshot and journal
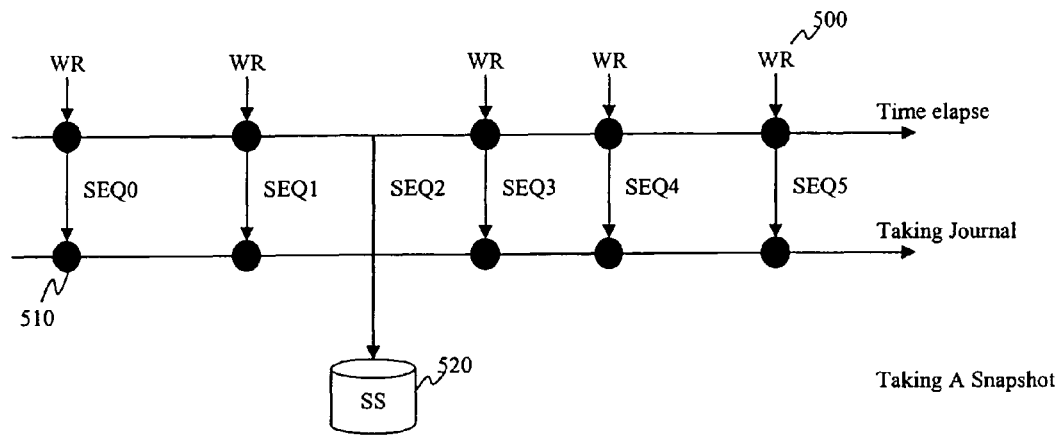
Fig. 5A Relationship between multiple snapshots and journal
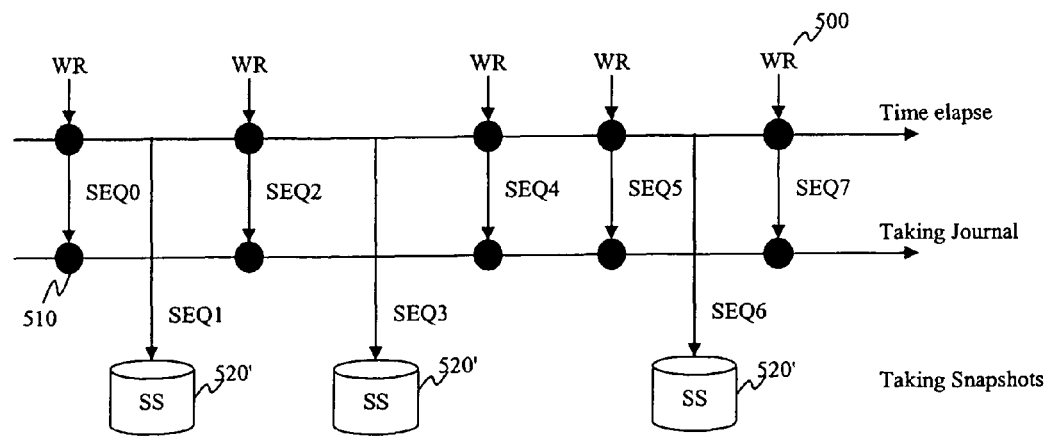

Fig. 6 Overflowing JNL
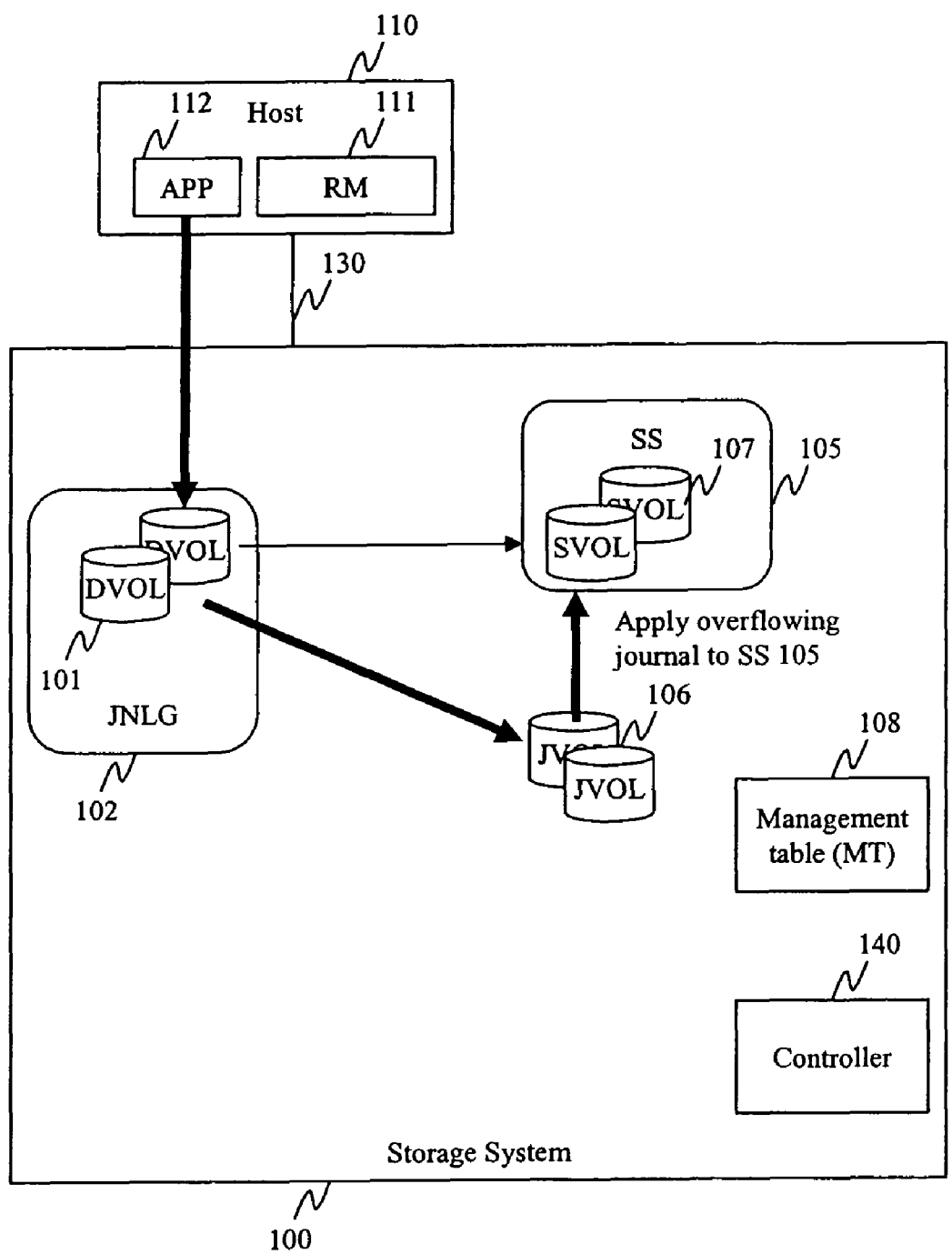

Fig. 7 Overflowing JNL

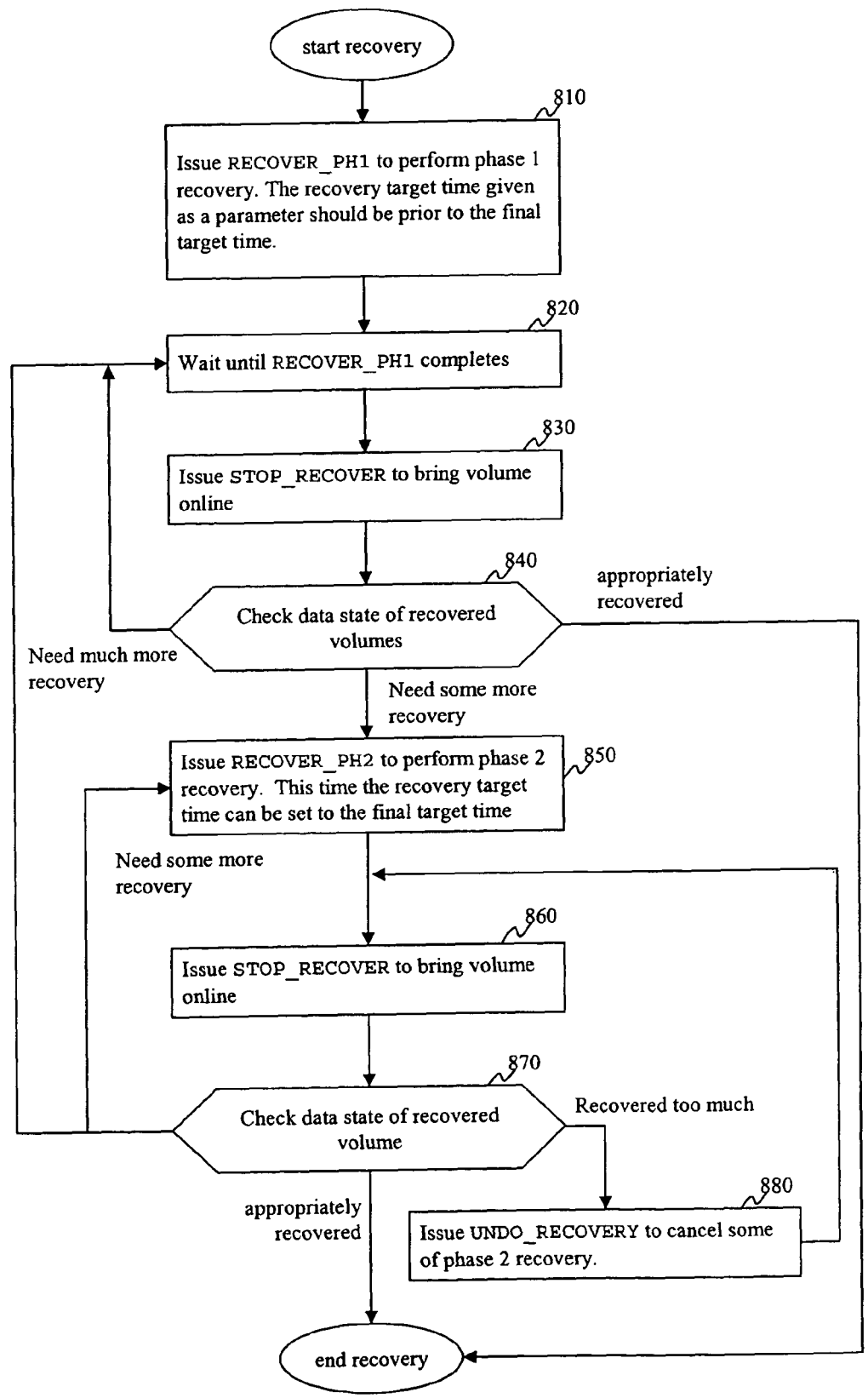
Fig. 8 Recovery procedure

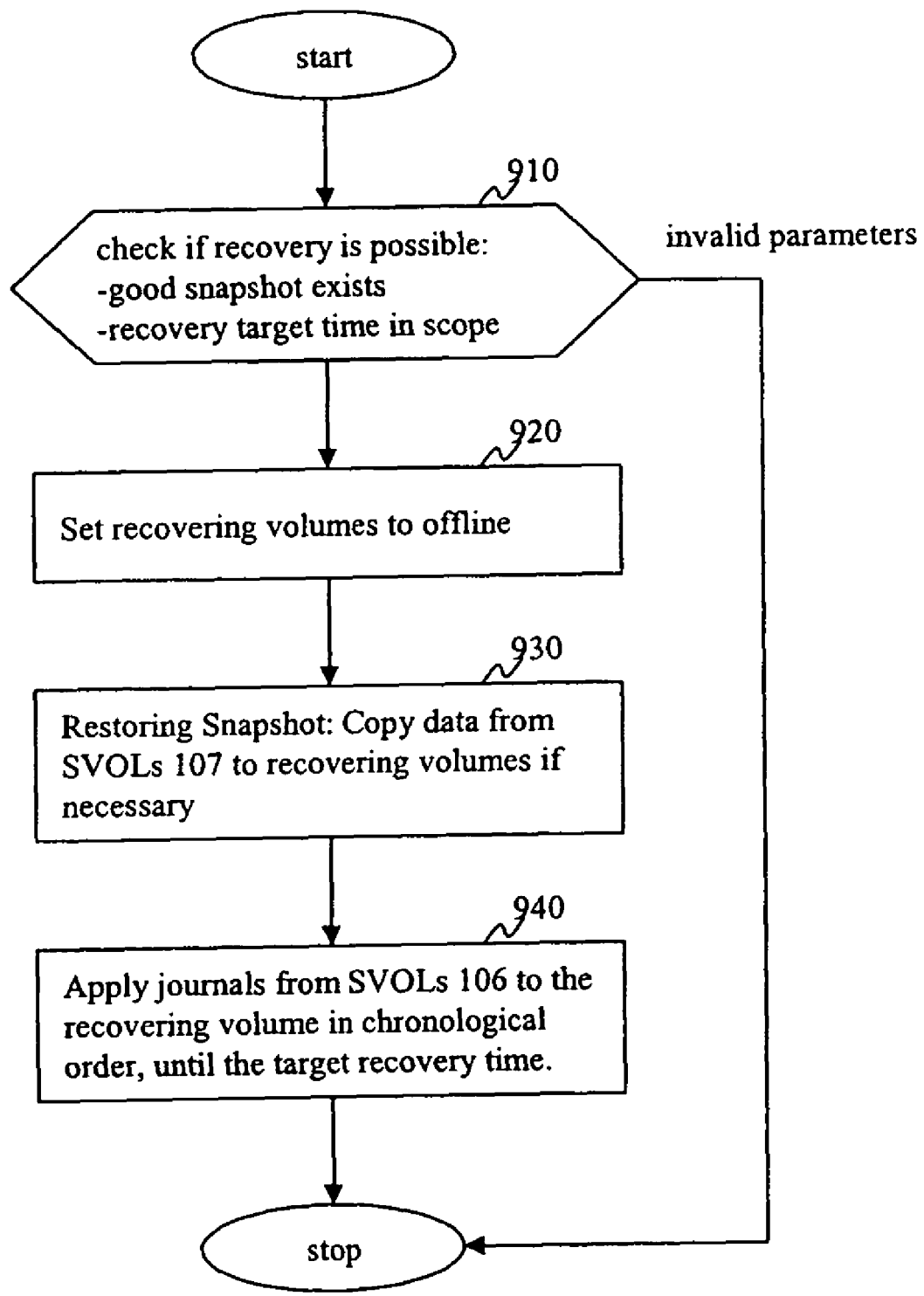
Fig. 9 Executing Phase1 Recovery

US 8,145,603 B2

METHOD AND APPARATUS FOR DATA RECOVERY USING STORAGE BASED JOURNALING

CROSS-REFERENCES TO RELATED APPLICATIONS

The present application is a Continuation Application of U.S. application Ser. No. 10/621,791, filed Jul. 16, 2003, which is herein incorporated by reference for all purposes.

This application is related to the following commonly owned and co-pending U.S. applications:

"Method and Apparatus for Data Recovery Using Storage Based Journaling," U.S. patent application Ser. No. 10/608,391, filed Jun. 26, 2003, and "Method and Apparatus for Synchronizing Applications for Data Recovery Using Storage Based Journaling," U.S. patent application Ser. No. 10/627,507, filed Jul. 25, 2003, both of which are herein incorporated by reference for all purposes.

BACKGROUND OF THE INVENTION

The present invention is related to computer storage and in particular to the recovery of data.

Several methods are conventionally used to prevent the loss of data. Typically, data is backed up in a periodic manner (e.g., once a day) by a system administrator. Many systems are commercially available which provide backup and recovery of data; e.g., Veritas NetBackup, Legato/Networker, and so on. Another technique is known as volume shadowing. This technique produces a mirror image of data onto a secondary storage system as it is being written to the primary storage system.

Journaling is a backup and restore technique commonly used in database systems. An image of the data to be backed up is taken. Then, as changes are made to the data, a journal of the changes is maintained. Recovery of data is accomplished by applying the journal to an appropriate image to recover data at any point in time. Typical database systems, such as Oracle, can perform journaling.

Except for database systems, however, there are no ways to recover data at any point in time. Even for database systems, applying a journal takes time since the procedure includes:
  reading the journal data from storage (e.g., disk)
  the journal must be analyzed to determine at where in the journal the desired data can be found
  apply the journal data to a suitable image of the data to reproduce the activities performed on the data—this usually involves accessing the image, and writing out data as the journal is applied Also, if an application running on the database system interacts with another application (regardless of whether it is a database system or not), then there is no way to recover its data at any point in time. This is because there is no coordination mechanism to recover the data of the other application.

Recovering data at any point in time addresses the following types of administrative requirements. For example, a typical request might be, "I deleted a file by mistake at around 10:00 am yesterday. I have to recover the file just before it was deleted."

If the data is not in a database system, this kind of request cannot be conveniently, if at all, serviced. A need therefore exists for processing data in a manner that facilitates recovery of lost data. A need exists for being able to provide data processing that facilitates data recovery in user environments other than in a database application, or database application interacting with other applications.

SUMMARY OF THE INVENTION

The invention is directed to method and apparatus for data recovery and comprises performing a fast recovery mode operation in conjunction with an undo-able recovery mode operation. In the fast recovery mode operation, after-journal entries are applied to a snapshot to update the snapshot. In the undo-able recovery mode operation, a before-journal entry is taken of the snapshot before applying an after-journal entry to it. A user can perform one or more undo operations when a snapshot has been updated in the undo-able recovery mode.

BRIEF DESCRIPTION OF THE DRAWINGS

Aspects, advantages and novel features of the present invention will become apparent from the following description of the invention presented in conjunction with the accompanying drawings:

FIG. 1 is a high level generalized block diagram of an illustrative embodiment of the present invention;

FIG. 2 is a generalized illustration of a illustrative embodiment of a data structure for storing journal entries in accordance with the present invention;

FIG. 3 is a generalized illustration of an illustrative embodiment of a data structure for managing the snapshot volumes and the journal entry volumes in accordance with the present invention;

FIG. 3A is a generalized illustration of an illustrative embodiment of a data structure for managing the snapshot volumes and the journal entry volumes in accordance with another aspect of the present invention;

FIG. 4 is a high level flow diagram highlighting the processing between the recovery manager and the controller in the storage system;

FIG. 5 illustrates the relationship between a snapshot and a plurality of journal entries;

FIG. 5A illustrates the relationship among a plurality of snapshots and a plurality of journal entries;

FIG. 6 is a high level illustration of the data flow when an overflow condition arises;

FIG. 7 is a high level flow chart highlighting an aspect of the controller in the storage system to handle an overflow condition;

FIG. 8 is a generalized flowchart highlighting data recovery in accordance with another aspect of the invention;

FIG. 9 is a flowchart highlighting the steps for phase I recovery;

DESCRIPTION OF THE SPECIFIC EMBODIMENTS

Figure 7A:
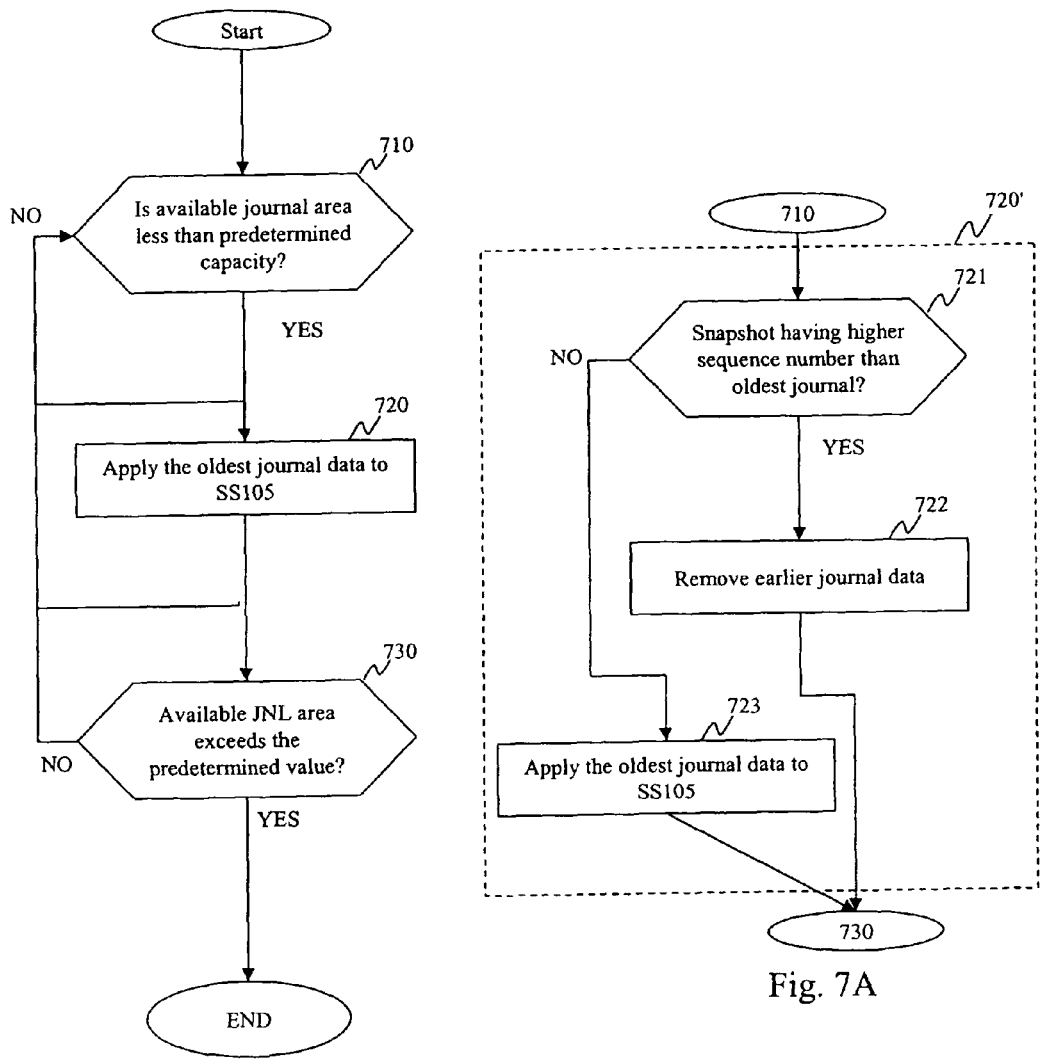
FIG. 7A illustrates an alternative to a processing step shown in FIG. 7.

FIG. 1 is a high level generalized block diagram of an illustrative embodiment of a backup and recovery system according to the present invention. When the system is activated, a snapshot is taken for production data volumes (DVOL) 101. The term "snapshot" in this context conventionally refers to a data image of at the data volume at a given point in time. Depending on system requirements, implementation, and so on, the snapshot can be of the entire data volume, or some portion or portions of the data volume(s); e.g., filesystem(s), file(s), directorie(s), etc. During the normal course of operation of the system in accordance with the invention, a journal entry is made for every write operation issued from the host to the data volumes. As will be discussed below, by applying a series of journal entries to an appropriate snapshot, data can be recovered at any point in time.

The backup and recovery system shown in FIG. 1 includes at least one storage system 100. Though not shown, one of ordinary skill can appreciate that the storage system includes suitable processor(s), memory, and control circuitry to perform IO between a host 110 and its storage media (e.g., disks). The backup and recovery system also requires at least one host 110. A suitable communication path 130 is provided between the host and the storage system.

The host 110 typically will have one or more user applications (APP) 112 executing on it. These applications will read and/or write data to storage media contained in the data volumes 101 of storage system 100. Thus, applications 112 and the data volumes 101 represent the target resources to be protected. It can be appreciated that data used by the user applications can be stored in one or more data volumes.

In accordance with the invention, a journal group (JNLG) 102 is defined. The data volumes 101 are organized into the journal group. In accordance with the present invention, a journal group is the smallest unit of data volumes where journaling of the write operations from the host 110 to the data volumes is guaranteed. The associated journal records the order of write operations from the host to the data volumes in proper sequence. The journal data produced by the journaling activity can be stored in one or more journal volumes (JVOL) 106.

The host 110 also includes a recovery manager (RM) 111. This component provides a high level coordination of the backup and recovery operations. Additional discussion about the recovery manager will be discussed below.

The storage system 100 provides a snapshot (SS) 105 of the data volumes comprising a journal group. For example, the snapshot 105 is representative of the data volumes 101 in the journal group 106 at the point in time that the snapshot was taken. Conventional methods are known for producing the snapshot image. One or more snapshot volumes (SVOL) 107 are provided in the storage system which contain the snapshot data. A snapshot can be contained in one or more snapshot volumes. Though the disclosed embodiment illustrates separate storage components for the journal data and the snapshot data, it can be appreciated that other implementations can provide a single storage component for storing the journal data and the snapshot data.

A management table (MT) 108 is provided to store the information relating to the journal group 102, the snapshot 105, and the journal volume(s) 106. FIG. 3 and the accompanying discussion below reveal additional detail about the management table.

A controller component 140 is also provided which coordinates the journaling of write operations and snapshots of the data volumes, and the corresponding movement of data among the different storage components 101, 106, 107. It can be appreciated that the controller component is a logical representation of a physical implementation which may comprise one or more sub-components distributed within the storage system 100.

FIG. 2 shows the data used in an implementation of the journal. When a write request from the host 110 arrives at the storage system 100, a journal is generated in response. The journal comprises a Journal Header 219 and Journal Data 225. The Journal Header 219 contains information about its corresponding Journal Data 225. The Journal Data 225 comprises the data (write data) that is the subject of the write operation. This kind of journal is also referred to as an "AFTER journal."

The Journal Header 219 comprises an offset number (JH_OFS) 211. The offset number identifies a particular data volume 101 in the journal group 102. In this particular implementation, the data volumes are ordered as the $0^{th}$ data volume, the $1^{st}$ data volume, the $2^{nd}$ data volume and so on. The offset numbers might be 0, 1, 2, etc.

A starting address in the data volume (identified by the offset number 211) to which the write data is to be written is stored to a field in the Journal Header 219 to contain an address (JH_ADR) 212. For example, the address can be represented as a block number (LBA, Logical Block Address).

A field in the Journal Header 219 stores a data length (JH_LEN) 213, which represents the data length of the write data. Typically it is represented as a number of blocks.

A field in the Journal Header 219 stores the write time (JH_TIME) 214, which represents the time when the write request arrives at the storage system 100. The write time can include the calendar date, hours, minutes, seconds and even milliseconds. This time can be provided by the disk controller 140 or by the host 110. For example, in a mainframe computing environment, two or more mainframe hosts share a timer, called the Sysplex Timer, and can provide the time in a write command when it is issued.

A sequence number (JH_SEQ) 215 is assigned to each write request. The sequence number is stored in a field in the Journal Header 219. Every sequence number within a given journal group 102 is unique. The sequence number is assigned to a journal entry when it is created.

A journal volume identifier (JH_JVOL) 216 is also stored in the Journal Header 219. The volume identifier identifies the journal volume 106 associated with the Journal Data 225. The identifier is indicative of the journal volume containing the Journal Data. It is noted that the Journal Data can be stored in a journal volume that is different from the journal volume which contains the Journal Header.

A journal data address (JH_JADR) 217 stored in the Journal Header 219 contains the beginning address of the Journal Data 225 in the associated journal volume 106 that contains the Journal Data.

FIG. 2 shows that the journal volume 106 comprises two data areas: a Journal Header Area 210 and a Journal Data Area 220. The Journal Header Area 210 contains only Journal Headers 219, and Journal Data Area 220 contains only Journal Data 225. The Journal Header is a fixed size data structure. A Journal Header is allocated sequentially from the beginning of the Journal Header Area. This sequential organization corresponds to the chronological order of the journal entries. As will be discussed, data is provided that points to the first journal entry in the list, which represents the "oldest" journal entry. It is typically necessary to find the Journal Header 219 for a given sequence number (as stored in the sequence number field 215) or for a given write time (as stored in the time field 214).

A journal type field (JH_TYPE) 218 identifies the type of journal entry. In accordance with the invention, two types of journal entries are kept: (1) an AFTER journal and (2) a BEFORE journal. An AFTER journal entry contains the data that is contained in the write operation for which a journal entry is made. A BEFORE journal entry contains the original data of the area in storage that is the target of a write operation. A BEFORE journal entry therefore represents the contents "before" the write operation is performed. The purpose of maintaining BEFORE journal entries will be discussed below.

Journal Header 219 and Journal Data 225 are contained in chronological order in their respective areas in the journal volume 106. Thus, the order in which the Journal Header and the Journal Data are stored in the journal volume is the same order as the assigned sequence number. As will be discussed below, an aspect of the present invention is that the journal information 219, 225 wrap within their respective areas 210, 220.

FIG. 3 shows detail about the management table 108 (FIG. 1). In order to manage the Journal Header Area 210 and Journal Data Area 220, pointers for each area are needed. As mentioned above, the management table maintains configuration information about a journal group 102 and the relationship between the journal group and its associated journal volume(s) 106 and snapshot image 105.

The management table 300 shown in FIG. 3 illustrates an example management table and its contents. The management table stores a journal group ID (GRID) 310 which identifies a particular journal group 102 in a storage system 100. A journal group name (GRNAME) 311 can also be provided to identify the journal group with a human recognizable identifier.

A journal attribute (GRATTR) 312 is associated with the journal group 102. In accordance with this particular implementation, two attributes are defined: MASTER and RESTORE. The MASTER attribute indicates the journal group is being journaled. The RESTORE attribute indicates that the journal group is being restored from a journal.

A journal status (GRSTS) 315 is associated with the journal group 102. There are two statuses: ACTIVE and INACTIVE.

The management table includes a field to hold a sequence counter (SEQ) 313. This counter serves as the source of sequence numbers used in the Journal Header 219. When creating a new journal, the sequence number 313 is read and assigned to the new journal. Then, the sequence number is incremented and written back into the management table.

The number (NUM_DVOL) 314 of data volumes 101 contained in a give journal group 102 is stored in the management table.

A data volume list (DVOL_LIST) 320 lists the data volumes in a journal group. In a particular implementation, DVOL_LIST is a pointer to the first entry of a data structure which holds the data volume information. This can be seen in FIG. 3. Each data volume information comprises an offset number (DVOL_OFFS) 321. For example, if the journal group 102 comprises three data volumes, the offset values could be 0, 1 and 2. A data volume identifier (DVOL_ID) 322 uniquely identifies a data volume within the entire storage system 100. A pointer (DVOL_NEXT) 324 points to the data structure holding information for the next data volume in the journal group; it is a NULL value otherwise.

The management table includes a field to store the number of journal volumes (NUM_JVOL) 330 that are being used to contain the data (journal header and journal data) associated with a journal group 102.

As described in FIG. 2, the Journal Header Area 210 contains the Journal Headers 219 for each journal; likewise for the Journal Data components 225. As mentioned above, an aspect of the invention is that the data areas 210, 220 wrap. This allows for journaling to continue despite the fact that there is limited space in each data area.

The management table includes fields to store pointers to different parts of the data areas 210, 220 to facilitate wrapping. Fields are provided to identify where the next journal entry is to be stored. A field (JI_HEAD_VOL) 331 identifies the journal volume 106 that contains the Journal Header Area 210 which will store the next new Journal Header 219. A field (JI_HEAD_ADR) 332 identifies an address on the journal volume of the location in the Journal Header Area where the next Journal Header will be stored. The journal volume that contains the Journal Data Area 220 into which the journal data will be stored is identified by information in a field (JI_DATA_VOL) 335. A field (JI_DATA_ADR) 336 identifies the specific address in the Journal Data Area where the data will be stored. Thus, the next journal entry to be written is "pointed" to by the information contained in the "JI_" fields 331, 332, 335, 336.

The management table also includes fields which identify the "oldest" journal entry. The use of this information will be described below. A field (JO_HEAD_VOL) 333 identifies the journal volume which stores the Journal Header Area 210 that contains the oldest Journal Header 219. A field (JO_HEAD_ADR) 334 identifies the address within the Journal Header Area of the location of the journal header of the oldest journal. A field (JO_DATA_VOL) 337 identifies the journal volume which stores the Journal Data Area 220 that contains the data of the oldest journal. The location of the data in the Journal Data Area is stored in a field (JO_DATA_ADR) 338.

The management table includes a list of journal volumes (JVOL_LIST) 340 associated with a particular journal group 102. In a particular implementation, JVOL_LIST is a pointer to a data structure of information for journal volumes. As can be seen in FIG. 3, each data structure comprises an offset number (JVOL_OFS) 341 which identifies a particular journal volume 106 associated with a given journal group 102. For example, if a journal group is associated with two journal volumes 106, then each journal volume might be identified by a 0 or a 1. A journal volume identifier (JVOL_ID) 342 uniquely identifies the journal volume within the storage system 100. Finally, a pointer (JVOL_NEXT) 344 points to the next data structure entry pertaining to the next journal volume associated with the journal group; it is a NULL value otherwise.

The management table includes a list (SS_LIST) 350 of snapshot images 105 associated with a given journal group 102. In this particular implementation, SS_LIST is a pointer to snapshot information data structures, as indicated in FIG. 3. Each snapshot information data structure includes a sequence number (SS_SEQ) 351 that is assigned when the snapshot is taken. As discussed above, the number comes from the sequence counter 313. A time value (SS_TIME) 352 indicates the time when the snapshot was taken. A status (SS_STS) 358 is associated with each snapshot; valid values include VALID and INVALID. A pointer (SS_NEXT) 353 points to the next snapshot information data structure; it is a NULL value otherwise.

Each snapshot information data structure also includes a list of snapshot volumes 107 (FIG. 1) used to store the snapshot images 105. As can be seen in FIG. 3, a pointer (SVOL_LIST) 354 to a snapshot volume information data structure is stored in each snapshot information data structure. Each snapshot volume information data structure includes an offset number (SVOL_OFFS) 355 which identifies a snapshot volume that contains at least a portion of the snapshot image. It is possible that a snapshot image will be segmented or otherwise partitioned and stored in more than one snapshot volume. In this particular implementation, the offset identifies the $i^{th}$ snapshot volume which contains a portion (segment, partition, etc) of the snapshot image. In one implementation, the $i^{th}$ segment of the snapshot image might be stored in the $i^{th}$ snapshot volume. Each snapshot volume information data structure further includes a snapshot volume identifier (SVOL_ID) 356 that uniquely identifies the snapshot volume in the storage system 100. A pointer (SVOL_NEXT) 357 points to the next snapshot volume information data structure for a given snapshot image.

FIG. 4 shows a flowchart highlighting the processing performed by the recovery manager 111 and Storage System 100 to initiate backup processing in accordance with the illustrative embodiment of the invention as shown in the figures. If journal entries are not recorded during the taking of a snapshot, the write operations corresponding to those journal entries would be lost and data corruption could occur during a data restoration operation. Thus, in accordance with an aspect of the invention, the journaling process is started prior to taking the first snapshot. Doing this ensures that any write operations which occur during the taking of a snapshot are journaled. As a note, any journal entries recorded prior to the completion of the snapshot can be ignored.

Further in accordance with the invention, a single sequence of numbers (SEQ) 313 are associated with each of one or more snapshots and journal entries, as they are created. The purpose of associating the same sequence of numbers to both the snapshots and the journal entries will be discussed below.

Continuing with FIG. 4, the recovery manager 111 might define, in a step 410, a journal group (JNLG) 102 if one has not already been defined. As indicated in FIG. 1, this may include identifying one or data volumes (DVOL) 101 for which journaling is performed, and identifying one or journal volumes (JVOL) 106 which are used to store the journal-related information. The recovery manager performs a suitable sequence of interactions with the storage system 100 to accomplish this. In a step 415, the storage system may create a management table 108 (FIG. 1), incorporating the various information shown in the table detail 300 illustrated in FIG. 3. Among other things, the process includes initializing the JVOL_LIST 340 to list the journal volumes which comprise the journal group 102 Likewise, the list of data volumes DVOL_LIST 320 is created. The fields which identify the next journal entry (or in this case where the table is first created, the first journal entry) are initialized. Thus, JI_HEAD_VOL 331 might identify the first in the list of journal volumes and JI_HEAD_ADR 332 might point to the first entry in the Journal Header Area 210 located in the first journal volume. Likewise, JI_DATA_VOL 335 might identify the first in the list of journal volumes and JI_DATA_ADR 336 might point to the beginning of the Journal Data Area 220 in the first journal volume. Note, that the header and the data areas 210, 220 may reside on different journal volumes, so JI_DATA_VOL might identify a journal volume different from the first journal volume.

In a step 420, the recovery manager 111 will initiate the journaling process. Suitable communication(s) are made to the storage system 100 to perform journaling. In a step 425, the storage system will make a journal entry (also referred to as an "AFTER journal") for each write operation that issues from the host 110.

With reference to FIG. 3, making a journal entry includes, among other things, identifying the location for the next journal entry. The fields JI_HEAD_VOL 331 and JI_HEAD_ADR 332 identify the journal volume 106 and the location in the Journal Header Area 210 of the next Journal Header 219. The sequence counter (SEQ) 313 from the management table is copied to (associated with) the JH_SEQ 215 field of the next header. The sequence counter is then incremented and stored back to the management table. Of course, the sequence counter can be incremented first, copied to JH_SEQ, and then stored back to the management table.

The fields JI_DATA_VOL 335 and in the management table identify the journal volume and the beginning of the Journal Data Area 220 for storing the data associated with the write operation. The JI_DATA_VOL and JI_DATA_ADR fields are copied to JH_JVOL 216 and to JH_ADR 212, respectively, of the Journal Header, thus providing the Journal Header with a pointer to its corresponding Journal Data. The data of the write operation is stored.

The JI_HEAD_VOL 331 and JI_HEAD_ADR 332 fields are updated to point to the next Journal Header 219 for the next journal entry. This involves taking the next contiguous Journal Header entry in the Journal Header Area 210. Likewise, the JI_DATA_ADR field (and perhaps JI_DATA_VOL field) is updated to reflect the beginning of the Journal Data Area for the next journal entry. This involves advancing to the next available location in the Journal Data Area. These fields therefore can be viewed as pointing to a list of journal entries. Journal entries in the list are linked together by virtue of the sequential organization of the Journal Headers 219 in the Journal Header Area 210.

When the end of the Journal Header Area 210 is reached, the Journal Header 219 for the next journal entry wraps to the beginning of the Journal Header Area. Similarly for the Journal Data 225. To prevent overwriting earlier journal entries, the present invention provides for a procedure to free up entries in the journal volume 106. This aspect of the invention is discussed below.

For the very first journal entry, the JO_HEAD_VOL field 333, JO_HEAD_ADR field 334, JO_DATA_VOL field 337, and the JO_DATA_ADR field 338 are set to contain their contents of their corresponding "JI_" fields. As will be explained the "JO_" fields point to the oldest journal entry. Thus, as new journal entries are made, the "JO_" fields do not advance while the "JI_" fields do advance. Update of the "JO_" fields is discussed below.

Continuing with the flowchart of FIG. 4, when the journaling process has been initiated, all write operations issuing from the host are journaled. Then in a step 430, the recovery manager 111 will initiate taking a snapshot of the data volumes 101. The storage system 100 receives an indication from the recovery manager to take a snapshot. In a step 435, the storage system performs the process of taking a snapshot of the data volumes. Among other things, this includes accessing SS_LIST 350 from the management table (FIG. 3). A suitable amount of memory is allocated for fields 351-354 to represent the next snapshot. The sequence counter (SEQ) 313 is copied to the field SS_SEQ 351 and incremented, in the manner discussed above for JH_SEQ 215. Thus, over time, a sequence of numbers is produced from SEQ 313, each number in the sequence being assigned either to a journal entry or a snapshot entry.

The snapshot is stored in one (or more) snapshot volumes (SVOL) 107. A suitable amount of memory is allocated for fields 355-357. The information relating to the SVOLs for storing the snapshot are then stored into the fields 355-357. If additional volumes are required to store the snapshot, then additional memory is allocated for fields 355-357.

FIG. 5 illustrates the relationship between journal entries and snapshots. The snapshot 520 represents the first snapshot image of the data volumes 101 belonging to a journal group 102. Note that journal entries (510) having sequence numbers SEQ0 and SEQ1 have been made, and represent journal entries for two write operations. These entries show that journaling has been initiated at a time prior to the snapshot being taken (step 420). Thus, at a time corresponding to the sequence number SEQ2, the recovery manager 111 initiates the taking of a snapshot, and since journaling has been initiated, any write operations occurring during the taking of the snapshot are journaled. Thus, the write operations 500 associated with the sequence numbers SEQ3 and higher show that those operations are being journaled. As an observation, the journal entries identified by sequence numbers SEQ0 and SEQ1 can be discarded or otherwise ignored.

Recovering data typically requires recover the data state of at least a portion of the data volumes 101 at a specific time. Generally, this is accomplished by applying one or more journal entries to a snapshot that was taken earlier in time relative to the journal entries. In the disclosed illustrative embodiment, the sequence number SEQ 313 is incremented each time it is assigned to a journal entry or to a snapshot. Therefore, it is a simple matter to identify which journal entries can be applied to a selected snapshot; i.e., those journal entries whose associated sequence numbers (JH_SEQ, 215) are greater than the sequence number (SS_SEQ, 351) associated with the selected snapshot.

For example, the administrator may specify some point in time, presumably a time that is earlier than the time (the "target time") at which the data in the data volume was lost or otherwise corrupted. The time field SS_TIME 352 for each snapshot is searched until a time earlier than the target time is found. Next, the Journal Headers 219 in the Journal Header Area 210 is searched, beginning from the "oldest" Journal Header. The oldest Journal Header can be identified by the "JO_" fields 333, 334, 337, and 338 in the management table. The Journal Headers are searched sequentially in the area 210 for the first header whose sequence number JH_SEQ 215 is greater than the sequence number SS_SEQ 351 associated with the selected snapshot. The selected snapshot is incrementally updated by applying each journal entry, one at a time, to the snapshot in sequential order, thus reproducing the sequence of write operations. This continues as long as the time field JH_TIME 214 of the journal entry is prior to the target time. The update ceases with the first journal entry whose time field 214 is past the target time.

In accordance with one aspect of the invention, a single snapshot is taken. All journal entries subsequent to that snapshot can then be applied to reconstruct the data state at a given time. In accordance with another aspect of the present invention, multiple snapshots can be taken. This is shown in FIG. 5A where multiple snapshots 520' are taken. In accordance with the invention, each snapshot and journal entry is assigned a sequence number in the order in which the object (snapshot or journal entry) is recorded. It can be appreciated that there typically will be many journal entries 510 recorded between each snapshot 520'. Having multiple snapshots allows for quicker recovery time for restoring data. The snapshot closest in time to the target recovery time would be selected. The journal entries made subsequent to the snapshot could then be applied to restore the desired data state.

FIG. 6 illustrates another aspect of the present invention. In accordance with the invention, a journal entry is made for every write operation issued from the host; this can result in a rather large number of journal entries. As time passes and journal entries accumulate, the one or more journal volumes 106 defined by the recovery manager 111 for a journal group 102 will eventually fill up. At that time no more journal entries can be made. As a consequence, subsequent write operations would not be journaled and recovery of the data state subsequent to the time the journal volumes become filled would not be possible.

FIG. 6 shows that the storage system 100 will apply journal entries to a suitable snapshot in response to detection of an "overflow" condition. An "overflow" is deemed to exist when the available space in the journal volume(s) falls below some predetermined threshold. It can be appreciated that many criteria can be used to determine if an overflow condition exists. A straightforward threshold is based on the total storage capacity of the journal volume(s) assigned for a journal group. When the free space becomes some percentage (say, 10%) of the total storage capacity, then an overflow condition exists. Another threshold might be used for each journal volume. In an aspect of the invention, the free space capacity in the journal volume(s) is periodically monitored. Alternatively, the free space can be monitored in an a periodic manner. For example, the intervals between monitoring can be randomly spaced. As another example, the monitoring intervals can be spaced apart depending on the level of free space; i.e., the monitoring interval can vary as a function of the free space level.

FIG. 7 highlights the processing which takes place in the storage system 100 to detect an overflow condition. Thus, in a step, 710, the storage system periodically checks the total free space of the journal volume(s) 106; e.g., every ten seconds. The free space can easily be calculated since the pointers (e.g., JI_CTL_VOL 331, JI_CTL_ADDR 332) in the management table 300 maintain the current state of the storage consumed by the journal volumes. If the free space is above the threshold, then the monitoring process simply waits for a period of time to pass and then repeats its check of the journal volume free space.

If the free space falls below a predetermined threshold, then in a step 720 some of the journal entries are applied to a snapshot to update the snapshot. In particular, the oldest journal entry(ies) are applied to the snapshot.

Referring to FIG. 3, the Journal Header 219 of the "oldest" journal entry is identified by the JO_HEAD_VOL field 333 and the JO_HEAD_ADR field 334. These fields identify the journal volume and the location in the journal volume of the Journal Header Area 210 of the oldest journal entry. Likewise, the Journal Data of the oldest journal entry is identified by the JO_DATA_VOL field 337 and the JO_DATA_ADR field 338. The journal entry identified by these fields is applied to a snapshot. The snapshot that is selected is the snapshot having an associated sequence number closest to the sequence number of the journal entry and earlier in time than the journal entry. Thus, in this particular implementation where the sequence number is incremented each time, the snapshot having the sequence number closest to but less than the sequence number of the journal entry is selected (i.e., "earlier in time). When the snapshot is updated by applying the journal entry to it, the applied journal entry is freed. This can simply involve updating the JO_HEAD_VOL field 333, JO_HEAD_ADR field 334, JO_DATA_VOL field 337, and the JO_DATA_ADR field 338 to the next journal entry.

As an observation, it can be appreciated by those of ordinary skill, that the sequence numbers will eventually wrap, and start counting from zero again. It is well within the level of ordinary skill to provide a suitable mechanism for keeping track of this when comparing sequence numbers.

Continuing with FIG. 7, after applying the journal entry to the snapshot to update the snapshot, a check is made of the increase in the journal volume free space as a result of the applied journal entry being freed up (step 730). The free space can be compared against the threshold criterion used in step 710. Alternatively, a different threshold can be used. For example, here a higher amount of free space may be required to terminate this process than was used to initiate the process. This avoids invoking the process too frequently, but once invoked the second higher threshold encourages recovering as much free space as is reasonable. It can be appreciated that these thresholds can be determined empirically over time by an administrator.

Thus, in step 730, if the threshold for stopping the process is met (i.e., free space exceeds threshold), then the process stops. Otherwise, step 720 is repeated for the next oldest journal entry. Steps 730 and 720 are repeated until the free space level meets the threshold criterion used in step 730.

FIG. 7A highlights sub-steps for an alternative embodiment to step 720 shown in FIG. 7. Step 720 frees up a journal entry by applying it to the latest snapshot that is not later in time than the journal entry. However, where multiple snapshots are available, it may be possible to avoid the time consuming process of applying the journal entry to a snapshot in order to update the snapshot.

FIG. 7A shows details for a step 720' that is an alternate to step 720 of FIG. 7. At a step 721, a determination is made whether a snapshot exists that is later in time than the oldest journal entry. This determination can be made by searching for the first snapshot whose associated sequence number is greater than that of the oldest journal entry. Alternatively, this determination can be made by looking for a snapshot that is a predetermined amount of time later than the oldest journal entry can be selected; for example, the criterion may be that the snapshot must be at least one hour later in time than the oldest journal entry. Still another alternate is to use the sequence numbers associated with the snapshots and the journal entries, rather than time. For example, the criterion might be to select a snapshot whose sequence number is N increments away from the sequence number of the oldest journal entry.

If such a snapshot can be found in step 721, then the earlier journal entries can be removed without having to apply them to a snapshot. Thus, in a step 722, the "JO_" fields (JO_HEAD_VOL 333, JO_HEAD_ADR 334, JO_DATA_VOL 337, and JO_DATA_ADR 338) are simply moved to a point in the list of journal entries that is later in time than the selected snapshot. If no such snapshot can be found, then in a step 723 the oldest journal entry is applied to a snapshot that is earlier in time than the oldest journal entry, as discussed for step 720.

Still another alternative for step 721 is simply to select the most recent snapshot. All the journal entries whose sequence numbers are less than that of the most recent snapshot can be freed. Again, this simply involves updating the "JO_" fields so they point to the first journal entry whose sequence number is greater than that of the most recent snapshot. Recall that an aspect of the invention is being able to recover the data state for any desired point in time. This can be accomplished by storing as many journal entries as possible and then applying the journal entries to a snapshot to reproduce the write operations. This last embodiment has the potential effect of removing large numbers of journal entries, thus reducing the range of time within which the data state can be recovered. Nevertheless, for a particular configuration it may be desirable to remove large numbers of journal entries for a given operating environment.

In another aspect of the present invention, recovery of the production volume(s) 101 can be facilitated by allowing the user to interact with the recovery process. A "fast recovery" can be performed which quickly recovers the data state to a point in time prior to a target time. A more granular recovery procedure can then be performed which allows a user to hone in on the target data state. The user can perform "undo-able recoveries" to inspect the data state in a trial and error manner by allowing the user to step forward and backward (undo operation) in time. This aspect of the invention allows a user to be less specific as to the time of the desired data state. The target time specified by the user need only be a time that he is certain is prior to the time of the target data state. It is understood that "the target data state" can refer to any desired state of the data.

FIG. 3A shows an illustrative embodiment of a management table 300' according to this aspect of the present invention. The alternative management table 300' includes two sets of fields, one set of fields (330, 331, 340) for managing AFTER journal entries and another set of fields (332, 333, 341) for managing BEFORE journal entries.

The fields related to the AFTER journal entries include a field to store the number of journal volumes (NUM_JVOLa) 330 that are used to contain the data (journal header and journal data) associated with the AFTER journal entries for a journal group 102.

As described in FIG. 2, the Journal Header Area 210 contains the Journal Headers 219 for each journal; likewise for the Journal Data components 225. As mentioned above, an aspect of the invention is that the data areas 210, 220 wrap. This allows for journaling to continue despite the fact that there is limited space in each data area.

The management table includes fields to store pointers to different parts of the data areas 210, 220 to facilitate wrapping. Pointer-type information is provided to facilitate identifying where the next journal entry is to be stored. A set of such information ("AFTER journal pointers") is provided for the AFTER journal entries. A field (JVOL_PTRa) 331 in the management table identifies the location of the AFTER journal pointers.

The AFTER journal entries are stored in one or more journal volumes, separate from the BEFORE journal entries. A field (JI_HEAD_VOL) 331a identifies the journal volume 106 that contains the Journal Header Area 210 from which the next Journal Header 219 will be obtained. A field (JI_HEAD_ADR) 331b identifies where in the in Journal Header Area the next Journal Header is located. The journal volume that contains the Journal Data Area 220 into which the journal data will be stored is identified by information in a field (JI_DATA_VOL) 331e. A field (JI_DATA_ADR) 331f identifies the specific address in the Journal Data Area where the data will be stored. Thus, the next AFTER journal entry to be written is "pointed" to by the information contained in the "JI_" fields 331a, 331b, 331e, 331f.

The AFTER journal pointers also includes fields which identify the "oldest" AFTER journal entry. The use of this information will be described below. A field (JO_HEAD_VOL) 331c identifies the journal volume which stores the Journal Header Area 210 that contains the oldest Journal Header 219. A field (JO_HEAD_ADR) 331d identifies the address within the Journal Header Area of the location of the journal header of the oldest journal. A field (JO_DATA_VOL) 331g identifies the journal volume which stores the Journal Data Area 220 that contains the data of the oldest journal. The location of the data in the Journal Data Area is stored in a field (JO_DATA_ADR) 331h.

The management table includes a list of journal volumes (JVOL_LISTa) 340 associated with the AFTER journal entries of a journal group 102. In a particular implementation, JVOL_LISTa is a pointer to a data structure of information for journal volumes. As can be seen in FIG. 3, each data structure comprises an offset number (JVOL_OFS) 340a which identifies a particular journal volume 106 associated with a given journal group 102. For example, if a journal group is associated with two journal volumes 106, then each journal volume might be identified by a 0 or a 1. A journal volume identifier (JVOL_ID) 340b uniquely identifies the journal volume within the storage system 100. Finally, a pointer (JVOL_N-

EXT) 340c points to the next data structure entry pertaining to the next journal volume associated with the journal group; it is a NULL value otherwise.

The management table also includes a set of similar fields for managing the BEFORE journal entries. The fields related to the BEFORE journal entries include a field to store the number of journal volumes (NUM_JVOLb) 332 that are being used to contain the data (journal header and journal data) associated with the BEFORE journal entries for a journal group 102.

As discussed above for the AFTER journal entries, an aspect of the invention is that the data areas 210, 220 wrap. The management table includes fields to store pointers to different parts of the data areas 210, 220 to facilitate wrapping. Pointer-type information is provided to facilitate identifying where the next BEFORE journal entry is to be stored. A set of such information ("BEFORE journal pointers") is provided for the BEFORE journal entries. A field (JVOL_P-TRb) 333 in the management table identifies the location of the BEFORE journal pointers.

The BEFORE journal entries are stored in one or more journal volumes, separate from the journal volume(s) used to store the AFTER journal entries. A field (JI_HEAD_VOL) 332a identifies the journal volume 106 that contains the Journal Header Area 210 from which the next Journal Header 219 will be obtained. A field (JI_HEAD_ADR) 332b identifies where in the in Journal Header Area the next Journal Header is located. The journal volume that contains the Journal Data Area 220 into which the journal data will be stored is identified by information in a field (JI_DATA_VOL) 332e. A field (JI_DATA_ADR) 332f identifies the specific address in the Journal Data Area where the data will be stored. Thus, the next BEFORE journal entry to be written is "pointed" to by the information contained in the "JI_" fields 332a, 332b, 332e, 332f.

The AFTER journal pointers also includes fields which identify the "oldest" BEFORE journal entry. The use of this information will be described below. A field (JO_HEAD_VOL) 332c identifies the journal volume which stores the Journal Header Area 210 that contains the oldest Journal Header 219. A field (JO_HEAD_ADR) 332d identifies the address within the Journal Header Area of the location of the journal header of the oldest journal. A field (JO_DATA_VOL) 332g identifies the journal volume which stores the Journal Data Area 220 that contains the data of the oldest journal. The location of the data in the Journal Data Area is stored in a field (JO_DATA_ADR) 332h.

The management table includes a list of journal volumes (JVOL_LISTb) 341 associated with the AFTER journal entries of a journal group 102. In a particular implementation, JVOL_LISTa is a pointer to a data structure of information for journal volumes. As can be seen in FIG. 3, each data structure comprises an offset number (JVOL_OFS) 341a which identifies a particular journal volume 106 associated with a given journal group 102. A journal volume identifier (JVOL_ID) 341b uniquely identifies the journal volume within the storage system 100. Finally, a pointer (JVOL_NEXT) 341c points to the next data structure entry pertaining to the next journal volume associated with the journal group; it is a NULL value otherwise.

The recover manager 111 provides the following interface to the storage system for the aspect of the invention which provides for "fast" and "undo-able" recovery modes. The interface is shown in a format of an application programmer's interface (API). The functionality and needed information (parameters) are described. It can be appreciated that any suitable programming language can be used.

| | |
|---|---|
| BACKUP | journal_volume |
| | This initiates backup processing to commence in the storage system 100. More specifically, the logging of AFTER journal entries is initiated for each write operation to the data volumes 101. The parameter journal_volume identifies the volume 102 that contains the journal entries. As discussed above, a initial snapshot is taken after journaling commences. |
| RECOVER_PH1 | journal_volume target_time |
| | This initiates a PHASE I recovery process. This recovery is the procedure discussed above. Briefly, AFTER journal entries are applied to an appropriate snapshot. The journal entries are contained in the volume(s) identified by journal_volume. The desired data state is specified by target_time. The target_time can be a time format (e.g., year:month:date:hh:mm). Alternatively, the target_time can be a journal sequence number 215, so that journal entries subsequent to the sequence number associated with the snapshot and up to the specified sequence number are applied. Still another alternative is that the target_time is simply the number of journal entries to be applied to a snapshot (e.g., apply the next one hundred journal entries). Depending on configuration and storage resources, the snapshot can be copied to the production volume. Data recovery can then proceed on the production volume. |
| RECOVER_PH2 | journal_volume_1 journal_volume_2 target_time |
| | This initiates a PHASE II recovery process. As will be discussed in more detail below, this procedure involves making a BEFORE journal entry before applying eacn AFTER journal entry to a snapshot. As will be explained below, this recovery process allows for "un-doing" an update operation on a snapshot. The AFTER journal entries are located in the volume identified by journal_volume_1. The BEFORE journal entries are located in the volume identified by journal_volume_2. The desired data state is specified by target_time. The desired data state is specified by target_time. The target_time can be a time format (e.g., year:month:date:hh:mm). Alternatively, the target_time can be a journal sequence number 215, so that journal entries subsequent to the sequence number associated with the snapshot and up to the specified sequence number are applied. Still another alternative is that the target_time is simply the number of journal entries to be applied to a snapshot (e.g., apply the next one hundred journal entries). |
| STOP_RECOVER | This will cause the storage system to cease recovery processing. Thus, a PHASE I recovery operation or a PHASE II recovery operation will be terminated. In addition, BEFORE journaling is initiated. This will cause BEFORE journal entries to be made each time the host 110 issues a write operation, in addition to the making an AFTER journal entry. |
| UNDO_RECOVER | journal_volume_1 journal_volume_2 target_time |
| | As will be discussed in more detail below, this operation will revert an updated snapshot to an earlier point in time. This is accomplished by "undoing" one or more applications of an AFTER journal entry. The target_time can be any of the forms previously discussed. |

Referring now to FIG. 8, a generalized process flow is shown highlighting the steps for recovering data in accordance with the "fast" and "undo-able" recovery mode aspects of the present invention. One will appreciate from the following that the described technique can be used to recover or otherwise retrieve a desired data state of any data volume(s). The retrieval methods and apparatus disclosed herein are not limited to disaster recovery scenarios. The invention has applicability for users (e.g., system administrators) who might have a need to look at the state of a file or a directory at an earlier point in time. Accordingly, the term "recovery volume" is used in a generic sense to refer to one or more volumes on which the data recovery process is being performed.

It can be appreciated that the recovery manager 111 can include a suitable interface for interaction with a user. An appropriate interface might be a graphical user interface, or a command line interface. It can be appreciated that voice recognition technology and even virtual reality technology can be used as input and output components of the interface for interacting with a user. Alternatively, the "user" can be a machine (such as a data processing system) rather than a human. In such a case, a suitable machine-machine interface can be readily devised and implemented.

The first phase of the recovery process is referred to as "fast" recovery. The idea is to quickly access the data state of the recovery volume at a point in time that is "close" in time to the desired data state, but prior in time to the desired data state. Thus, in a step 810, the recovery manager 111 obtains from the user a "target time" that specifies a point in time that is close to the time of the desired data state. A suitable query to the user might inform the user as to the nature of this target time. For example, if the user interacted with a system administrator, she might tell the administrator that she was sure her files were not deleted until after 10:30 AM. The target time would then be 10:30 AM, or earlier. Likewise, a user interface can obtain such information from a user by presenting a suitable set of queries or prompts. Given the target time, the recovery manager can then issue a RECOVER_PH1 operation to the storage system (e.g., system 100, FIG. 1) that contains the recovery volume.

In response, the storage system would initiate phase I recovery. Referring to FIG. 9 for a moment, the storage system 100 in response to the RECOVER_PH1 request, would determine in a step 910 whether recovery is possible. Two conditions are checked:
  (1) a good snapshot exists—A snapshot must have been taken between the oldest journal and newest journal. As discussed above, every snapshot has a sequence number. The sequence number can be used to identify a suitable snapshot. If the sequence number of a candidate snapshot is greater than that of the oldest journal and smaller than that of the newest journal, then the snapshot is suitable.
  (2) recovery target time is in scope—The target time that user specifies must be between the oldest journal and the newest journal.

Then in a step 920, the recovery volume is set to an offline state. In the context of the present invention "offline" is taken to mean that the user, and more generally the host device 110, cannot access the recovery volume. For example, in the case that the production volume is being used as the recovery volume, it is likely to be desirable that the host 110 be prevented at least from issuing write operations to the volume. Also, the host typically will not be permitted to perform read operations. Of course, the storage system itself has full access to the recovery volume in order to perform the recovery task.

In a step 930, the snapshot is copied to the recovery volume in preparation for phase I recovery. The production volume itself can be the recovery volume. However, it can be appreciated that the recovery manager 111 can allow the user to specify a volume other than the production volume to serve as the target of the data recovery operation. For example, the recovery volume can be the volume on which the snapshot is stored. Using a volume other than the production volume to perform the recovery operation may be preferred where it is desirable to provide continued use of the production volume.

In a step 940, one or more AFTER journal entries are applied to update the snapshot volume in the manner as discussed previously. Enough AFTER journal entries are applied to update the snapshot to a point in time up to or prior to the user-specified target time.

Returning to FIG. 8, upon completion of phase I recovery, the storage system 100 can signal the recovery manager (step 820) to indicate phase I has completed. The recovery manager 111 would then issue a STOP_RECOVER operation to the storage system. In response, the storage system 100 (step 830) would put the recovery volume into an online state. In the context of the present invention, the "online" state is taken to mean that the host device 110 is given access to the recovery volume.

Next, in a step 840, the user is given the opportunity to review the state of the data on the recovery volume to determine whether the desired data state has been recovered. At this point, the data state has been recovered to some point in time prior to the time of the desired data state. Additional recovery might bee needed to reach the desired data state. If the desired data state has been achieved then the recovery process is stopped. If the desired data state is not achieved, then a determination is made whether another phase I recovery operation is to be performed, or whether a phase II recovery operation is to be performed.

Recall that phase I recovery involves updating the snapshot by applying the AFTER journal entries to it to reproduce the sequence of write operations made since the snapshot was taken. A phase II recovery operation involves taking a BEFORE journal entry for each AFTER journal entry that is applied. It can be appreciated that phase II recovery is a slower process than phase I recover. The decision whether to proceed using phase I recovery mode or phase II recovery mode can be made by the user after she has inspected the recovered data state. For example, she may learn from inspecting the recovered data state that an additional few hours of recovery is needed, in which case she may specify via the recovery manager 111 to perform the faster phase I recovery and provide a refined target time. If the recovered data state seems close to the desired data state, then the user may want to perform the slower phase II recovery to take advantage of the "undo" aspect (see below) provided by a phase II recovery operation.

Alternatively, the user interface can algorithmically determine whether to perform phase I or phase II recover. The interface can input the user's refined target time and compare that against the initial target time. Based on the comparison, the interface can choose an appropriate recovery mode. For example, if the difference in time is X minutes or greater, then a phase I recovery is performed, otherwise a phase II recovery is commenced.

A factor to consider at this decision point (step 840) is that phase I recovery cannot be conveniently "undone." If the recovered data state is beyond the desired data state, then the only way to reverse the data recovery action is to start again from the original snapshot. This can be time consuming. A phase II recovery in accordance with the present invention, on the other hand, can be undone. Thus, if a recovered data state is close to the user's refined time estimate, then a phase II recovery operation may be preferred.

FIG. 8 shows a step 850 for the initiation of phase II recovery. This includes taking the recovery volume offline and applying one or more AFTER journal entries to the snapshot as before, in order to move the state of the recovered data forward in time. However, phase II processing includes the additional step of taking BEFORE journal entries. With BEFORE journaling turned on, a BEFORE journal entry is taken of the snapshot prior to updating the snapshot with an AFTER journal entry; one such BEFORE journal entry is taken for each AFTER journal entry. As mentioned above, a BEFORE journal entry records the data that is stored in the target location of the write operation. Consequently, the state of the snapshot is preserved in a BEFORE journal entry prior to updating the snapshot with an AFTER journal entry. Thus, pairs of BEFORE journal and AFTER journal entries are created during phase II recovery. In accordance with the invention, the sequence numbering provided by the sequence number (SEQ) 313 is associated with each BEFORE entry journal. Thus, the same sequence of numbers is applied to BEFORE journal entries as well as to AFTER journal entries and snapshots.

In a step 860, a STOP_RECOVER operation is issued to put the recovery volume in an online state. The user is then able to inspect the recovery volume. Based on the inspection, if the user determines in a step 870 that the desired data state of the recovery volume is achieved, then the recovery process is complete. If the user determines that the desired data state is not achieved, then a further determination is made whether the data recovery has gone beyond the desired data state. If so, then the snapshot updates are "undone" (step 880) by accessing one or more BEFORE journal entries. This combination of taking BEFORE journals and AFTER journals constitutes a phase II recovery.

Figure 10:
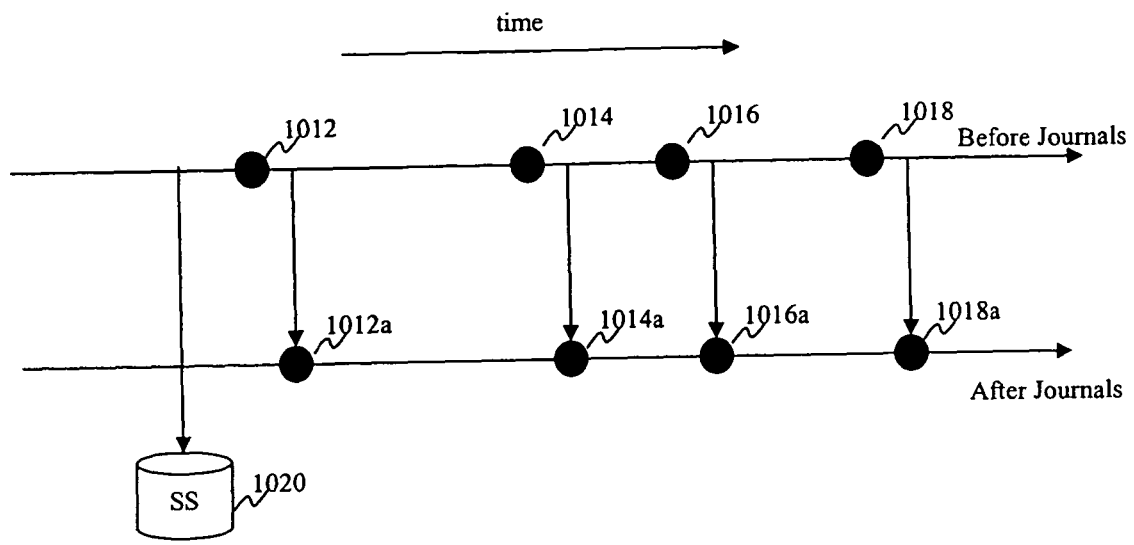
FIG. 10 is a diagrammatic illustration of the BEFORE and AFTER journaling.

FIG. 10 illustrates how an updated snapshot can be undone. The figure shows that at some point in time a snapshot 1020 of a recovery volume (e.g., data volume 101, FIG. 1) was taken. The figure shows phase II processing where BEFORE and AFTER journal entries are taken. Thus, the application of the AFTER journal entry 1012a to the snapshot is preceded by a BEFORE journal entry 1012. The BEFORE journal entry contains the original data that is stored in the area of the recovery volume that is the target of the write operation recorded by the AFTER journal entry, prior to performing the write operation. Thus, a pair of journal entries is created comprising an AFTER journal entry and a corresponding BEFORE journal entry. When the BEFORE journal entry 1012 is recorded, the AFTER journal entry 1012a is then applied to the snapshot to update the snapshot.

Continuing, to the next AFTER journal entry 1014a, again a BEFORE journal entry 1014 is created to record the original data in the area of the production volume that is the target of the AFTER journal entry before the AFTER journal entry is applied to the snapshot 1020. Again, a pair of journal entries result: an AFTER journal entry 1014a and its corresponding BEFORE journal entry 1014. Similar BEFORE journal entries 1016 and 1018 are created for the AFTER journal entries 1016a and 1018a.

Figure 11:
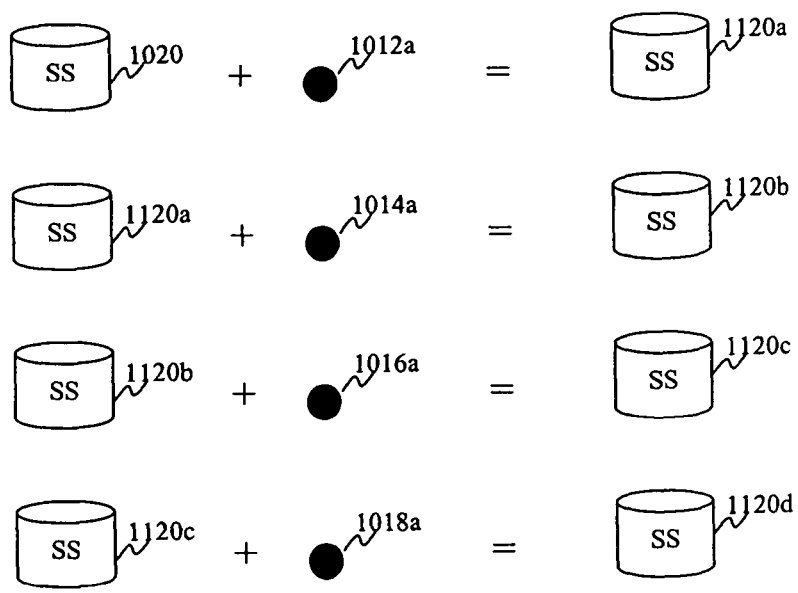
FIG. 11 is provided to illustrate how an "undo" operation can be performed using the journaling shown in FIG. 10.

Now, with reference to FIG. 11, in accordance with phase II processing, the snapshot 1020 is updated by the sequential application of the AFTER journal entries 1012a-1018a (along with the creation of the corresponding BEFORE journal entries 1012-1018). Thus, the snapshot 1020 is updated by performing the write operation indicated in the AFTER journal entry 1012a to produce an updated snapshot 1120a. The updated snapshot 1120a is again updated by performing the write operation indicated in the AFTER journal entry 1014a to produce 1120b. The updated snapshot 1120b is subsequently updated in turn by the AFTER journal entries 1016a and 1018a to produce snapshots 1120c and 1120d.

Referring to FIGS. 10 and 11, an "undo" operation can now be described. The procedure includes applying the information contained in the BEFORE journals to the updated snapshots. The BEFORE journal entries are applied in timewise reverse order. Thus, to restore the snapshot from its state in 1012d to its previous state in 1120c, the BEFORE journal entry 1018 is applied to the snapshot 1020d to reproduce the snapshot 1120c. To perform another "undo" iteration, the BEFORE journal entry 1016 is applied to the snapshot 1120c to reproduce the snapshot 1120b. From this discussion, it can be appreciated that in order to "undo" a snapshot that has been updated by a set of AFTER journals, a BEFORE journal is needed that exists earlier in time than any of the AFTER journals in the set. Phase II processing provides the requisite BEFORE journal entries in order to perform the undo operation.

Returning to FIG. 8, one or more of the BEFORE journal entries can be applied (step 880) to the updated snapshot in this manner to perform a "reverse update" of one or more of the AFTER journal entries. This has the effect of moving the state of the recovered data in the recovery volume backward in time. The number of BEFORE journal entries to apply can be a fixed number; for example, move back in time by one minute increments, or by some number N of BEFORE journal entries. Alternatively, the user can specify how far back in time to move the data state by specifying a reverse target time (e.g., an absolute time such as 10:34 AM), or an increment of time (e.g., a delta time value such as 10 minutes). The user is given the opportunity to inspect the data state of the recovery volume to determine whether to continue backward in time or to move forward. Repeating this allows the user to restore the desired data state in an iterative and interactive manner by shuffling the data state backward and forward in time.

It can be appreciated that phase II processing will be slower than phase I recovery for the reason that a BACKUP journal entry must be created before applying an AFTER journal entry to update the snapshot. For this reason, phase I recovery is also referred to as "fast recovery." Since phase II recovery permits the user to undo an updated snapshot, it can be referred to as "undo-able" recovery.

The foregoing disclosed embodiments typically can be provided using a combination of hardware and software implementations; e.g., combinations of software, firmware, and/or custom logic such as ASICs (application specific ICs) are possible. One of ordinary skill can readily appreciate that the underlying technical implementation will be determined based on factors including but not limited to or restricted to system cost, system performance, the existence of legacy software and legacy hardware, operating environment, and so on. The disclosed embodiments can be readily reduced to specific implementations without undue experimentation by those of ordinary skill in the relevant art.

What is claimed is:

1. A storage system to be coupled to a host computer via a network, the storage system comprising:
   a data volume storing write data from the host computer;
   a snapshot storing area for storing a plurality of snapshots including a first snapshot of at least a portion of the data volume at a first point in time, and also storing a second snapshot of the portion of the data volume at a second point in time that is a latest snapshot among the stored snapshots; and
   a journal storing area storing an oldest after-journal entry before the first point in time, an after-journal entry between the first and second point in time, and another after-journal entry after the second point in time,
   wherein the journal storing area has a variable amount of available space in which new after-journal entries can be written,
   wherein if the amount of available space in the journal storing area falls below a predetermined threshold, then the amount of available space is increased by sequentially freeing journals beginning with the oldest after-journal entry without applying the journals until the amount of available space is no longer below the predetermined threshold, wherein if, during the increasing of the amount of available space, it becomes necessary to free said another after-journal entry after the second point in time, then said another after-journal entry is applied to the second snapshot to create a new snapshot before being made free, wherein when receiving a data recovery request to recover data at a target point in time between the first point in time and the second point in time, determining whether recovery is possible, and if recovery is possible, by using a copy of the first snapshot in a recovery volume and at least a portion of one after-journal entry to perform recovery at the target point in time, and wherein based on a user's selection, the storage system determines whether to create a before-journal entry before applying said portion of one after-journal entry to the copy of the first snapshot, the before-journal entry being recording data that is stored in a location where the after-journal entry is applied to enable rollback to a snapshot at any point in time between the first snapshot and the second snapshot.

2. The storage system according to claim 1, wherein the snapshot storing area and/or the journal storing area are configured with storage volumes.

3. The storage system according to claim 1, wherein at least one of the after-journal entries are stored in the journal storing area before storing one of the plurality of snapshots in the snapshot storing area.

4. The storage system according to claim 1, wherein the first snapshot is prior to and closest in time to the target point in time.

5. A storage system to be coupled to a host computer via a network, the storage system comprising:
 a data volume storing write data from the host computer;
 a snapshot storing area storing a first snapshot of at least a portion of the data volume for a first point in time, the first point in time represented, by first information that specifies a time when the first snapshot is taken, the snapshot storing area further storing a second snapshot of the portion of the data volume for a second point in time subsequent to the first point in time, the second point in time represented by second information that specifies a time when the second snapshot is taken;
 a journal storing area storing after-journal entries including an after-journal entry between the first point in time and the second point in time, wherein the after-journal entries comprise the write data and time ordering information specifying write ordering of write operations to the data volume; and
 a storage controller to conduct write operations according to write requests received from the host computer, to manage snapshot operations to store a plurality of snapshots including the first snapshot and the second snapshot, wherein the first and second information are associated with the time ordering information, wherein the storage system manages journal operations to record the after-journal entries and monitors the journal storing area so as to free at least one of the stored after-journal entries in the journal storing area without applying the after-journal entries if an amount of available space in the journal storing area is less than a predetermined threshold and as long as data recovery is still possible by using at least the second snapshot and the stored after-journal entries, wherein when receiving a data recovery request with a first target time between the first point in time and the second point in time, if the storage system determines that the data recovery request can be performed based on the first target time and the stored after-journal entries, the storage system copies the first snapshot to a recovery volume, and selects at least one of the after-journal entries corresponding to the write operations conducted between the first point in time and the first target time based on the first information, the time ordering information, and the first target time to recover data of the portion of the data volume at the first target time by applying the selected after-journal entries to the copied snapshot in the recovery volume, and wherein based on a user's selection, the storage system determines whether to create a before-journal entry before applying the selected after-journal entries to the copied snapshot, the before-journal entry being recording data that is stored in a location where the after-journal entry is applied to enable rollback to a snapshot at any point in time between the first snapshot and the second snapshot.

6. The storage system according to claim 5, wherein when receiving another data recovery request with a second target time between the first point in time and the second point in time, the storage system copies the first snapshot to the recovery volume, and selects at least one of the after-journal entries corresponding to the write operations conducted between the first point in time and the second target time based on the first information, the time ordering information, and the second target time to recover data of the portion of the data volume at the second target time by applying the selected after-journal entries to the copied snapshot in the recovery volume.

7. The storage system according to claim 6, wherein the write data stored in the journal storing area are stored in chronological order.

8. The storage system according to claim 6, wherein the snapshot storing area and/or the journal storing area are configured with storage volumes.

9. The storage system according to claim 6, wherein at least one of the journal entries are stored in the journal storing area before storing one of the plurality of snapshots in the snapshot storing area.

10. The storage system according to claim 6, wherein the journal operations are started prior to starting the snapshot operations.

11. The storage system according to claim 6, wherein the first snapshot is prior to and closest in time to the target point in time.

12. The storage system according to claim 5, wherein the time ordering information includes time information and/or a sequence number.

13. The storage system according to claim 12, wherein the first and second information include time information and/or a sequence number.

14. The storage system according to claim 5, wherein the before-journal entry records data that is stored in a location of the copied snapshot where the selected after-journal entries are to be applied.

15. The storage system according to claim 14, wherein the before-journal entry is applied in a time wise reverse order.

16. A method of storing information in a storage system to be coupled to a host computer via a network, the method comprising the steps of:

storing write data received from the host computer in a data volume;

storing, in a snapshot storing area, a plurality of snapshots including a first snapshot of at least a portion of the data volume at a first point in time and also a second snapshot of the portion of the data volume at a second point in time that is latest snapshot among the stored snapshots;

storing, in a journal storing area, an oldest after-journal entry before the first point in time, an after-journal entry between the first and second point in time, and another after-journal entry after the second point in time, wherein the journal storing area has a variable amount of available space in which new after-journal entries can be written;

if the amount of available space in the journal storing area falls below a predetermined threshold, increasing the amount of available space by sequentially freeing journals beginning with the oldest after-journal without applying the journals until the amount of available space is no longer below the predetermined threshold;

if, when increasing of the amount of available space, it becomes necessary to free said another after-journal entry after the second point in time, then applying said another after-journal entry to the second snapshot to create a new snapshot before freeing them;

when receiving a data recovery request to recover data at a target point in time between the first point in time and the second point in time, determining whether recovery is possible, and if recovery is possible, performing recovery at the target point in time by using a copy of the first snapshot in a recovery volume and at least a portion of one after-journal entry, and wherein based on a user's selection, the storage system determines whether to create a before-journal entry before applying said portion of one after-journal entry to the copy of the first snapshot, the before-journal entry being recording data that is stored in a location where the after-journal entry is applied to enable rollback to a snapshot at any point in time between the first snapshot and the second snapshot.

17. The storage system according to claim 16, wherein the snapshot storing area and/or the journal storing area are configured with storage volumes.

18. The storage system according to claim 16, wherein at least one of the after-journal entries are stored in the journal storing area before storing one of the plurality of snapshots in the snapshot storing area.

19. The storage system according to claim 16, wherein the first snapshot is prior to and closest in time to the target point in time.

\* \* \* \* \*